United States Patent [19]

Iwamatsu et al.

[11] Patent Number: 5,262,908
[45] Date of Patent: Nov. 16, 1993

[54] TRACKING CONTROL DEVICE FOR MAGNETIC RECORDING/REPRODUCING APPARATUS

[75] Inventors: Tadashi Iwamatsu; Chiaki Yamawaki; Tohru Okuda, all of Nara, Japan

[73] Assignee: Sharp Kabushiki Kaisha, Osaka, Japan

[21] Appl. No.: 704,771

[22] Filed: Feb. 14, 1991

[30] Foreign Application Priority Data

| Feb. 20, 1990 | [JP] | Japan | 2-40188 |
| Feb. 20, 1990 | [JP] | Japan | 2-40189 |
| Feb. 20, 1990 | [JP] | Japan | 2-40190 |
| Feb. 20, 1990 | [JP] | Japan | 2-40191 |

[51] Int. Cl.⁵ .................. G11B 5/584; G11B 21/10
[52] U.S. Cl. ................ 360/77.12; 360/77.06; 360/78.02
[58] Field of Search ........... 360/77.12, 77.06, 78.02

[56] References Cited

U.S. PATENT DOCUMENTS

| 3,576,553 | 4/1971 | Hertrich | 360/77.12 |
| 4,176,381 | 11/1979 | de Niet | 360/77.12 |
| 4,347,534 | 8/1982 | Kimura | 360/77.12 |
| 4,392,163 | 7/1983 | Rijckaert et al. | 360/76 |
| 4,472,750 | 9/1984 | Klumpp et al. | 360/78.01 |
| 4,476,503 | 10/1984 | Solhjell | 360/75 |
| 4,639,796 | 1/1987 | Solhjell | 360/77.12 |
| 4,677,505 | 6/1987 | Nukada et al. | 360/77.12 |
| 4,975,791 | 12/1990 | Eggebeen | 360/77.12 |
| 5,008,765 | 4/1991 | Youngquist | 360/77.12 |

FOREIGN PATENT DOCUMENTS

| 56-74822 | 6/1981 | Japan . |
| 0145554 | 11/1981 | Japan | 360/77.12 |
| 59-168924 | 9/1984 | Japan . |
| 60-107724 | 6/1985 | Japan . |
| 60-107725 | 6/1985 | Japan . |
| 62-183018 | 8/1987 | Japan . |
| 62-183019 | 8/1987 | Japan . |

*Primary Examiner*—John S. Heyman
*Attorney, Agent, or Firm*—Nixon & Vanderhye

[57] ABSTRACT

A tracking control device for a magnetic recording/reproducing apparatus arranged in such a manner that a head unit having a plurality of magnetic heads is successively moved in the widthwise direction of a magnetic tape for switching tracking positions so that data recording/reproducing is, by each of the plurality of magnetic heads, performed along a plurality of data tracks formed on the magnetic tape in parallel to a direction in which the magnetic tape moves. The tracking control device has at least two servo signal reproducing heads provided integrally with the head unit and provided for the purpose of reproducing servo signals for tracking use from a plurality of servo tracks formed in parallel to the data tracks on the magnetic tape, and movement control unit for controlling, at each of the tracking positions, movement of the head unit in the widthwise direction in accordance with the difference in two servo signals reproduced by adjacent two of the servo signal reproducing heads corresponded to each of the tracking positions.

20 Claims, 21 Drawing Sheets

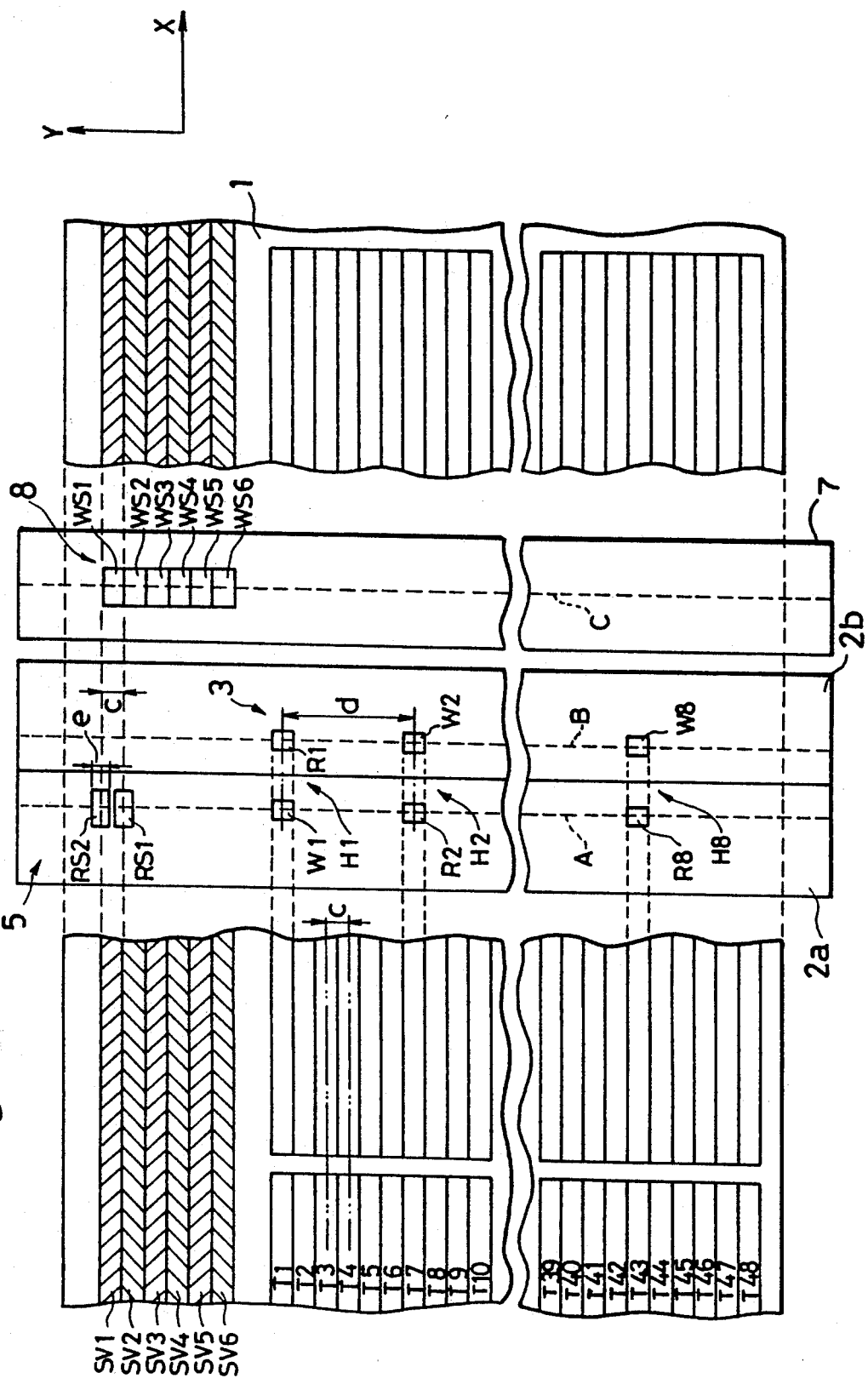

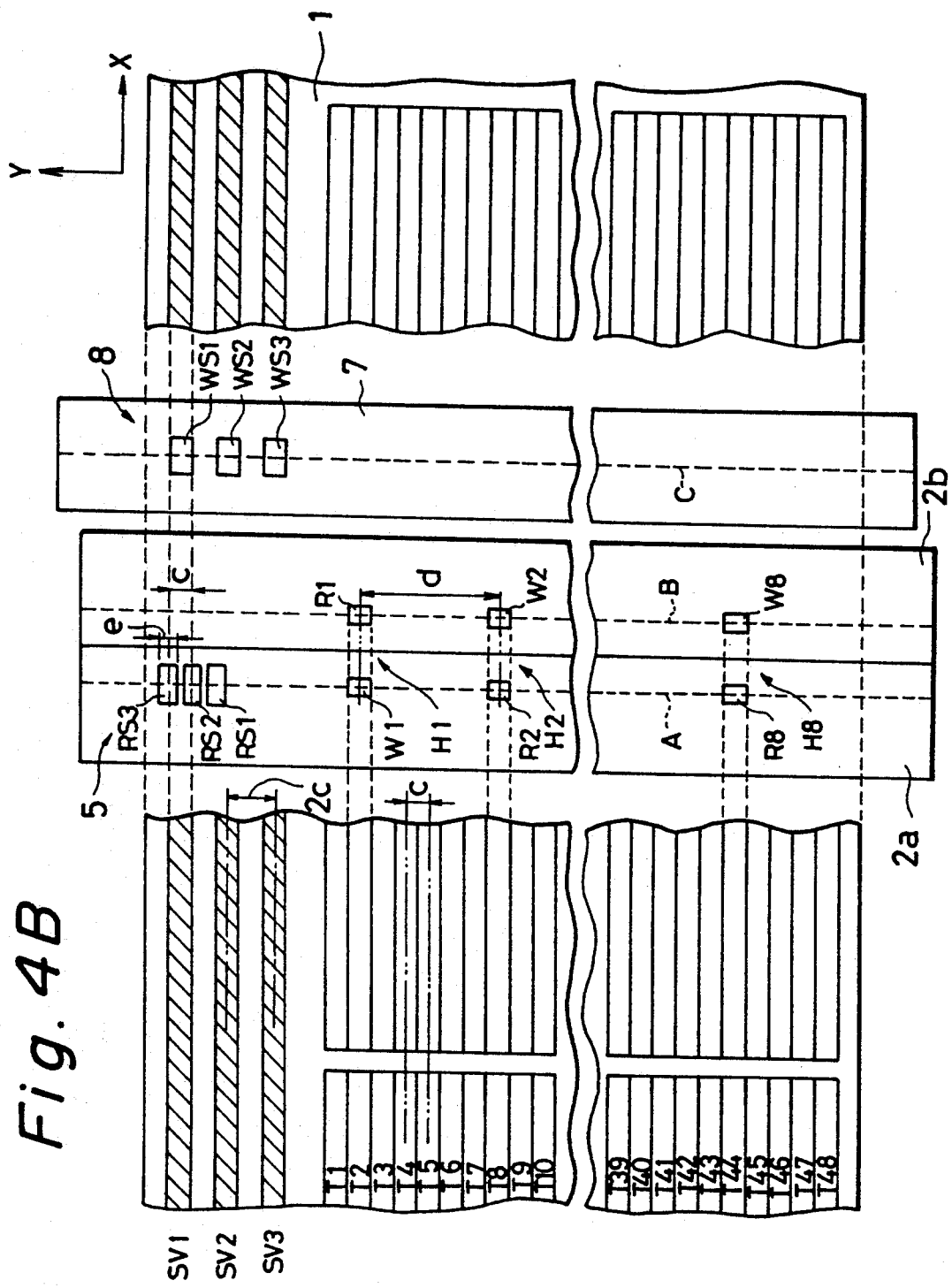

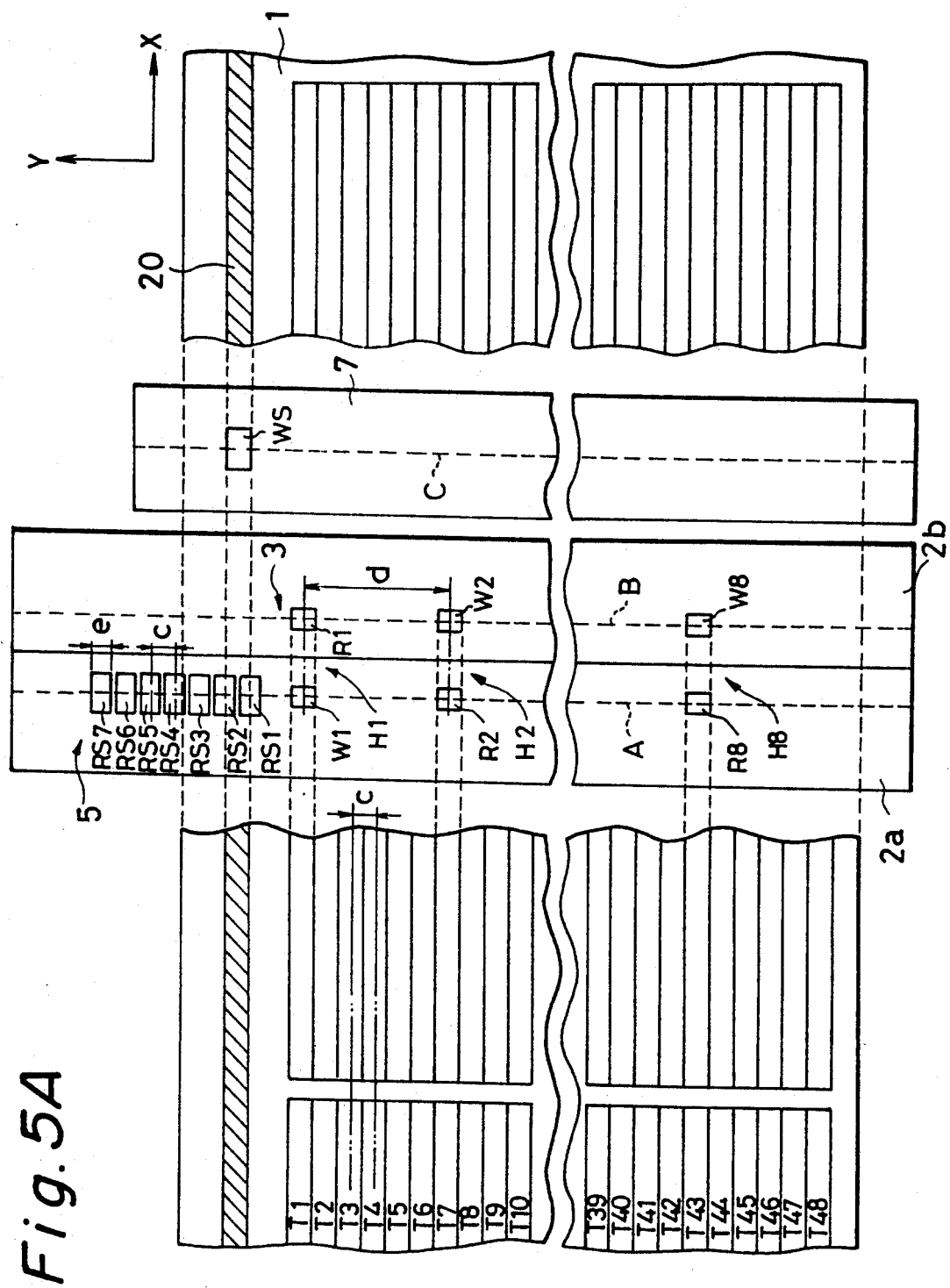

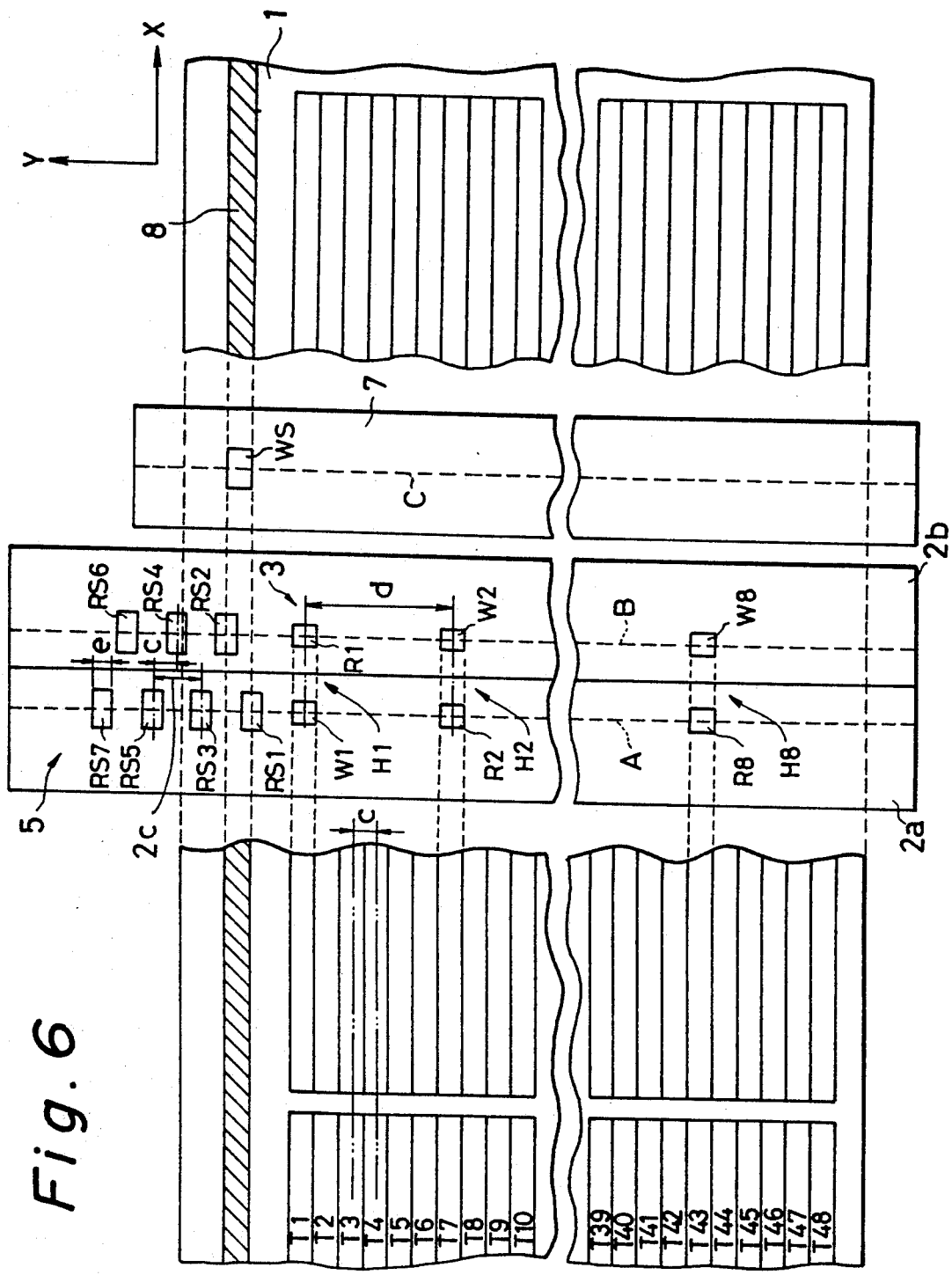

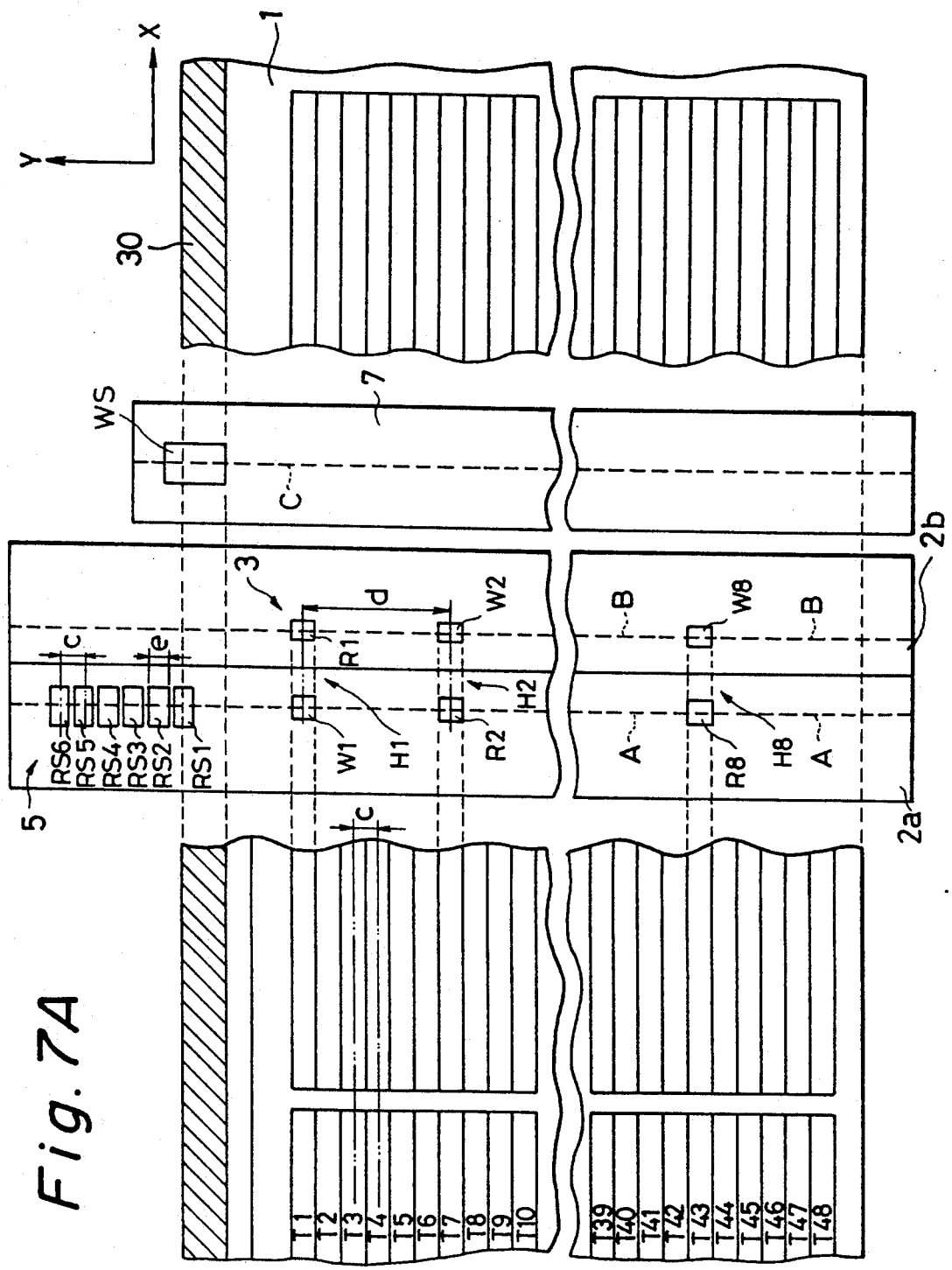

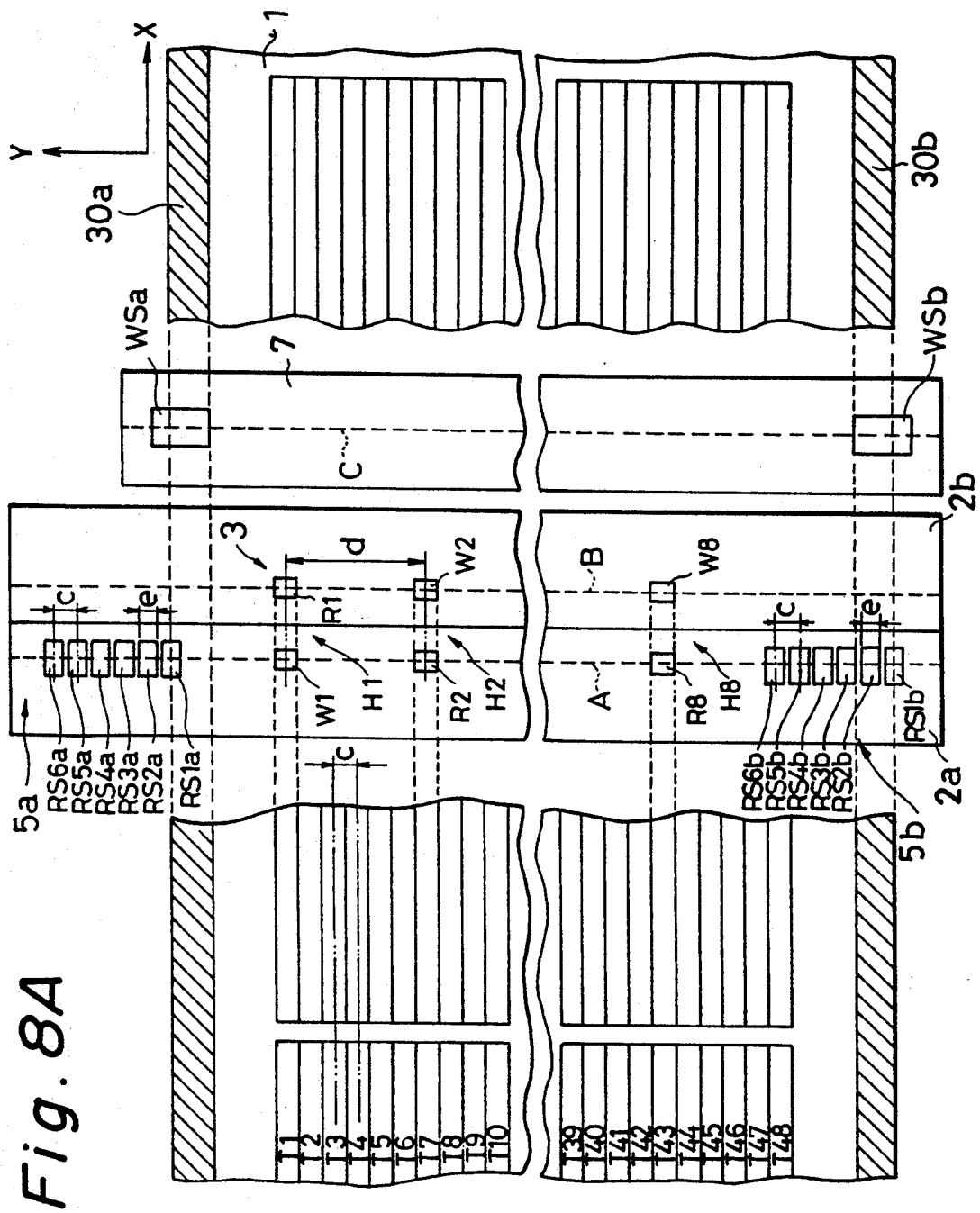

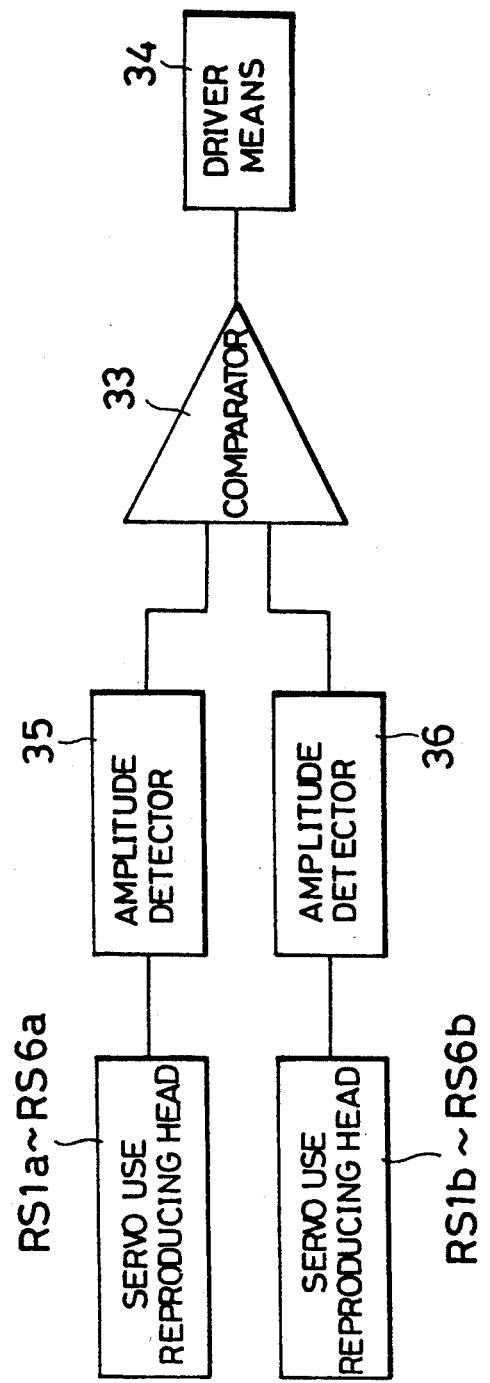

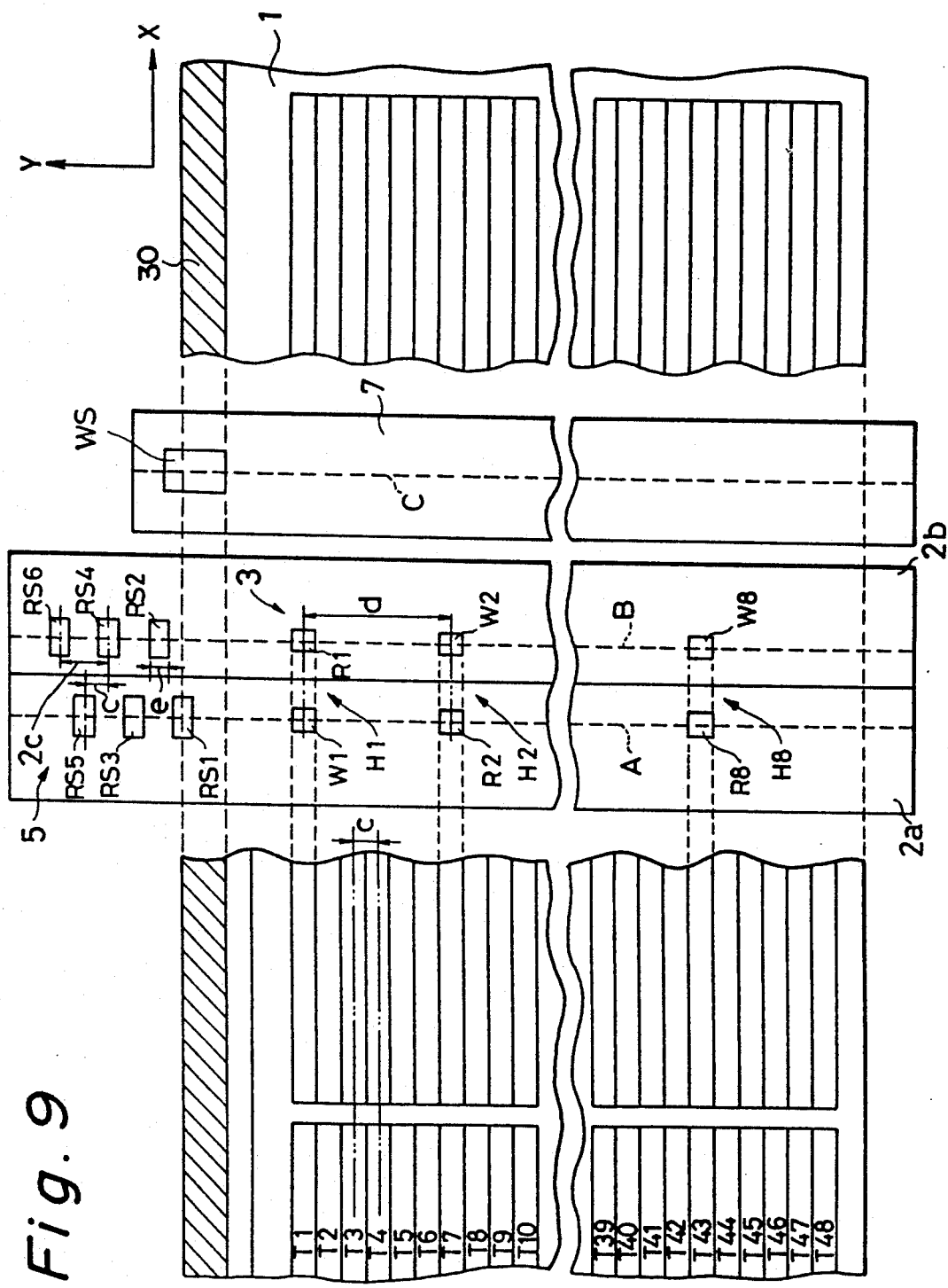

TRACKING CONTROL DEVICE FOR MAGNETIC RECORDING/REPRODUCING APPARATUS

RELATED APPLICATION

This application is related to commonly assigned copending U.S. patent application Ser. No. 07/498,571 filed Mar. 26, 1990 for "MAGNETIC RECORDING-/REPRODUCING APPARATUS" naming Tadashi Iwamatsu and Tohru Okuda as inventors. The entire contents of that application is hereby incorporated by reference.

BACKGROUND OF THE INVENTION

(1) Field of the Invention

The present invention relates to a tracking control device for a magnetic recording/reproducing apparatus for recording/reproducing information along a plurality of tracks running in parallel to the direction in which a magnetic tape moves by successively moving magnetic heads in the widthwise direction of the magnetic tape.

(2) Description of the Related Art

A magnetic recording/reproducing device for use in an audio apparatus has been usually arranged in such a manner that the number of the tracks and that of the heads are the same except for devices having a rotary head. The "number of the tracks" means the total number of data tracks formed in parallel to a direction in which the tape moves. The "number of heads" means the number of magnetic heads included by a combination head which integrally has magnetic heads such as the recording heads and reproducing heads or the recording/reproducing heads. A magnetic recording/reproducing apparatus of the type described above is provided with tape head relative position restricting means for restricting the relative position between the magnetic tape and the magnetic head. A typical restricting means has a guide post in which there is formed a pair of flanges for guiding the two widthwise directional ends of the magnetic tape.

The above-described tape head relative position restricting means is arranged to prevent the vertical waving of the magnetic tape by bringing the two ends of the magnetic tape into contact with the flanges. However, when a magnetic tape is wider than the distance between the two flanges, the ends of the magnetic tape can be damaged due to mechanical stress applied to the ends of the magnetic tape. Since the magnetic tape must be protected from damage, it has been difficult to improve the accuracy in positioning the magnetic tape more precisely than within several tens of micromillimeters. What is even worse, the above-described problem experienced with a high density magnetic recording/reproducing apparatus the allowable offtrack quantity of which is in a range between a level of ten and several tens of millimeters cannot satisfactorily be overcome by simply restricting the positional movement of the magnetic tape by the above-described flanges.

Recently, thin film magnetic heads have been advanced, causing combination heads of a type having a large number of heads to be developed. Therefore, the degree of density in the multi-track magnetic recording/reproducing apparatus can further be raised. The apparatus of the type described above is able to record data to a track having a narrower width. However, the allowable offtrack is reduced. Therefore, an apparatus of the type described above have a tape head relative position restricting means arranged to comprise, in addition to the above-described flanges, control means for causing the magnetic head to follow waving of the magnetic tape by its means for detecting the relative position between the magnetic head and the magnetic tape or between the magnetic head and a track, and head drive means for moving the magnetic head in the widthwise direction of the tape.

The above-described apparatus is exemplified by a fixed head digital audio tape recorder arranged in such a manner that the number of the heads and that of the tracks are the same.

The above-described apparatus is, as disclosed in Singaku Giho EA83-56, Shingaku Giho EA81-64 and Sharp Giho 1984-28, arranged in such a manner that a servo only track recorded on a magnetic tape is traced by a pair of reproducing heads disposed in parallel to each other in the widthwise direction of the tape. The thus obtained reproduced outputs are subjected to a comparison so that a following control is performed. As a result, the relative position between the magnetic head and the magnetic tape is restricted.

As another example of the tape head relative position restricting means, a control device of a magnetic recording/reproducing apparatus which is arranged in such a manner that the number of the heads and that of the tracks are the same has been disclosed (Japanese Patent Publication No. 63-64811). The control device is arranged in such a manner that a tracking signal is recorded along an end of the magnetic tape in the widthwise direction. The tracking signal thus recorded is reproduced by a servo reproducing head so as to subject the reproduced signal level to a comparison with a reference level. As an alternative to this, tracking information is recorded along the two ends of the magnetic tape in the widthwise direction. The thus recorded tracking information is reproduced by a pair of servo reproducing heads. The levels of the two reproduced signals are subjected to a comparison with each other. As a result, the tracking is performed.

Since the multi-track magnetic recording/reproducing apparatus such as the above-described fixed head digital audio tape recorder has a track pitch of hundreds of micromillimeters, a combination head in which a plurality of recording heads and reproducing heads are integrally formed can be used by employing a thin film head. The plurality of recording heads and the reproducing heads correspond to a plurality of tracks formed on the magnetic tape.

To raise the recording density, the track width can be reduced by reducing the gap width of the magnetic head. However, since the degree of integration of the thin film head involves a certain limitation, the track pitch cannot be reduced satisfactorily. What is even worse, when the number of the heads is increased, the size of the circuit will be enlarged, causing an excessive cost to be raised. Therefore, a high density magnetic recording/reproducing apparatus which is arranged in such a manner that the track pitch is several tens of micromillimeters and the number of the tracks is several tens to hundreds cannot be realized by a structure in which the number of the heads and the number of the tracks are the same.

Accordingly, a recording system called a serpentine system has recently been employed in a multi-track magnetic recording/reproducing apparatus which is a backup storage device for an information processing system and which is usually called a cassette streamer. The serpentine system being arranged in such a manner that the number of the heads is smaller than the number of the recording heads.

The serpentine system will be described with reference to FIG. 1. A magnetic tape 21 which moves in direction X and the width of which is designated by Y has a track group 22 composed of 16 tracks T1 to T16 which are, for example, formed in direction Y at equal pitch a. A combination head 23 is disposed to correspond to the above-described track group 22, the combination head 23 comprising, for example, four recording heads W1 to W4 and four reproducing heads R1 to R4.

The recording heads W1 to W4 are disposed in the direction Y at same pitch b (b=4a), each of the reproducing heads R1 to R4 being arranged to form a pair in cooperation with corresponding recording heads W1 to W4 disposed in direction X or −X.

When the recording or reproducing operation is performed, the above-described combination head 23 is first moved to a position shown in FIG. 1. That is, it is moved to a position at which the center of the recording head W1 and that of the reproducing head R1 coincide with the center of the track T1, the center of the recording head W2 and that of the reproducing head R2 coincide with the center of the track T5, the center of the recording head W3 and that of the reproducing head R3 coincide with the center of the track T9 and the center of the recording head W4 and that of the reproducing head R4 coincide with the center of the track T13.

In this state, the magnetic tape 21 is moved in the direction X when data is recorded so that data is simultaneously recorded to the tracks T1 and T9 by the recording heads W1 and W3.

After data recording to a lengthwise end of the magnetic tape 21 has been ended, the magnetic tape 21 is moved in the direction −X so that data is simultaneously recorded to the tracks T5 and T13 by the recording heads W2 and W4. After data recording to a lengthwise end of the magnetic tape 21 has been ended, the combination head 23 is moved in the direction −Y by the track pitch a so that the center of the recording head W1 and that of the reproducing head R1 are made coincide with the center of the track T2. Then, the magnetic tape is allowed to reciprocate in the directions X and −X while maintaining the thus realized relative position. As a result, data is recorded to the tracks T2, T6, T10 and T14. Then, the combination head 23 is similarly moved by a in the direction −Y whenever the magnetic tape 21 reciprocates once. Thus, information is recorded to all of tracks T1 to T16 after four times of the reciprocating motions have been completed.

The above-described serpentine system multi-track magnetic recording/reproducing apparatus is constituted in such a manner that data is recorded/reproduced from a multiplicity of tracks by moving a reduced number of magnetic heads in the widthwise direction of the tape. Therefore, the track pitch can be reduced and the number of the tracks can thereby be increased by arranging the structure in which the magnetic head is moved by a multiplicity of times. Therefore, the thin film head can be integrated smoothly.

As the head tape relative position restricting means of the serpentine system multi-track magnetic recording/reproducing apparatus, a head positioning technology has, as disclosed in, for example, Japanese Patent Laid-Open No. 62-183019, been known in which the stepping motor is open-loop-controlled in addition to the restriction performed by the above-described flanges.

However, in the serpentine system magnetic recording/reproducing apparatus in which the track pitch is several tens of micromillimeters, the track width becomes, of course, several tens of micromillimeters. Therefore, the offtrack becomes a level of ten to several micromillimeters. However, the tape head relative position restricting means arranged in such a manner that the above-described open-loop control is performed cannot correspond to the small above-described allowable offtrack.

In a case where the total stroke of the combination head of the above-described serpentine system magnetic recording/reproducing apparatus is about 1 mm at the time of switching the track, the servo reproducing head must have a relatively large dynamic range of about 60 dB in order to reduce the tracking residual error to be smaller than 1 $\mu$m.

However, the conventional method in which one servo track is traced by two servo heads encounters a problem in that satisfactory S/N ratio and linearity cannot be obtained in overall region of the large dynamic range. Therefore, the tracking accuracy at each track switch position has been unsatisfactory.

SUMMARY OF THE INVENTION

An object of the present invention is to provide a tracking control device for a serpentine system magnetic recording/reproducing apparatus capable of overcoming the problems of the above-described conventional apparatuses.

The object of the invention can be achieved by each of the following devices.

A tracking control device for a magnetic recording/reproducing apparatus arranged in such a manner that a head unit having a plurality of magnetic heads is successively moved in the widthwise direction of a magnetic tape for switching tracking positions. Data recording/reproducing is, by each of said plurality of magnetic heads, performed along a plurality of data tracks formed on the magnetic tape in parallel to a direction in which the tape moves. This tracking control device has at least two servo signal reproducing heads provided integrally with the head unit to produce servo signals for tracking a plurality of servo tracks parallel to the data tracks on said magnetic tape.

A movement control means at each of said tracking positions controls movement of the head unit across the tape in accordance with the difference between two servo signals reproduced by adjacent servo signal reproducing heads.

The pitch of the servo tracks is an integral multiple of a pitch of said data tracks. The number of servo tracks is the same as or smaller than the number of tracking positions to be switched and the servo signal reproducing heads are disposed at substantially the same pitch as the pitch of data tracks.

Similarly a tracking control device for a magnetic recording/reproducing apparatus moves a plurality of magnetic heads successively to switch tracking positions so that data recording/reproducing is performed along a plurality of data tracks the magnetic tape. The tracking control device includes:

servo signal reproducing heads integrally with the head unit to reproduce servo signals for tracking from a servo track parallel to the data tracks on said magnetic tape; and movement control means controlling movement of the head unit in a widthwise direction in accordance with the difference in two servo signals reproduced by adjacent servo signal reproducing heads, wherein the number of servo signal reproducing heads is one greater than the number of tracking positions and the servo signal reproducing heads are disposed at substantially the same pitch as the pitch of the data tracks.

A tracking control device for a magnetic recording-/reproducing apparatus with a head unit having a plurality of magnetic heads successively moved in the widthwise direction of a magnetic tape for switching tracking positions. The tracking control device includes:

servo signal reproducing heads with the head unit to reproduce servo signals recorded along one edge of the magnetic tape and movement control means controlling the movement of the head unit in accordance with the difference between a level of a servo signal reproduced by one of the servo signal reproducing heads. The number of servo signal reproducing heads is the same as the number of said tracking positions and the servo signal reproducing heads are disposed at substantially the same pitch as a pitch of the data tracks.

A tracking control device for a magnetic recording-/reproducing apparatus having a combination head including fewer magnetic heads than the number of data tracks on the magnetic tape. The tracking control device moves the successively combination head to switch tracking positions. The tracking control device includes reflecting type photointerrupters integral with the combination head to confront an edge of the magnetic tape so as to correspond to one tracking position for generating an intensity of light signal reflected from said magnetic tape;

movement control means controlling movement of the combination head in accordance with the difference between a level of a signal generated by a reflecting photointerrupters and a level of a predetermined reference signal. The number of reflecting type photointerrupters is the same as the number of tracking positions. The reflecting type photointerrupters are disposed at substantially the same pitch as a pitch of data tracks.

According to the present invention, it is possible to provide a serpentine high density magnetic recording-/reproducing apparatus capable of recording/reproducing information from tracks formed on a magnetic tape at a pitch of several tens of microns.

Further objects and advantages of the present invention will be apparent from the following description, reference being had to the accompanying drawings wherein preferred embodiments of the present invention are clearly shown.

BRIEF DESCRIPTION OF THE DRAWINGS

FIGS. 2A and 2B illustrate a first embodiment of a tracking control apparatus according to the present invention;

FIGS. 4A and 4B illustrate a modification to the first embodiment of the tracking control device;

FIGS. 5A and 5C illustrate a second embodiment of the tracking control device according to the present invention;

FIG. 6 illustrates a modification to the second embodiment of the tracking control device;

FIGS. 7A and 7C illustrate a third embodiment of the tracking control device according to the present invention;

FIG. 8A illustrates a first modification to the third embodiment of the tracking control device;

FIG. 8B is a block diagram of a drive means of the tracking control device according to a first modification;

FIG. 9 illustrates a second modification to a third embodiment of the tracking control device;

DESCRIPTION OF THE PREFERRED EMBODIMENTS

Figure 1:
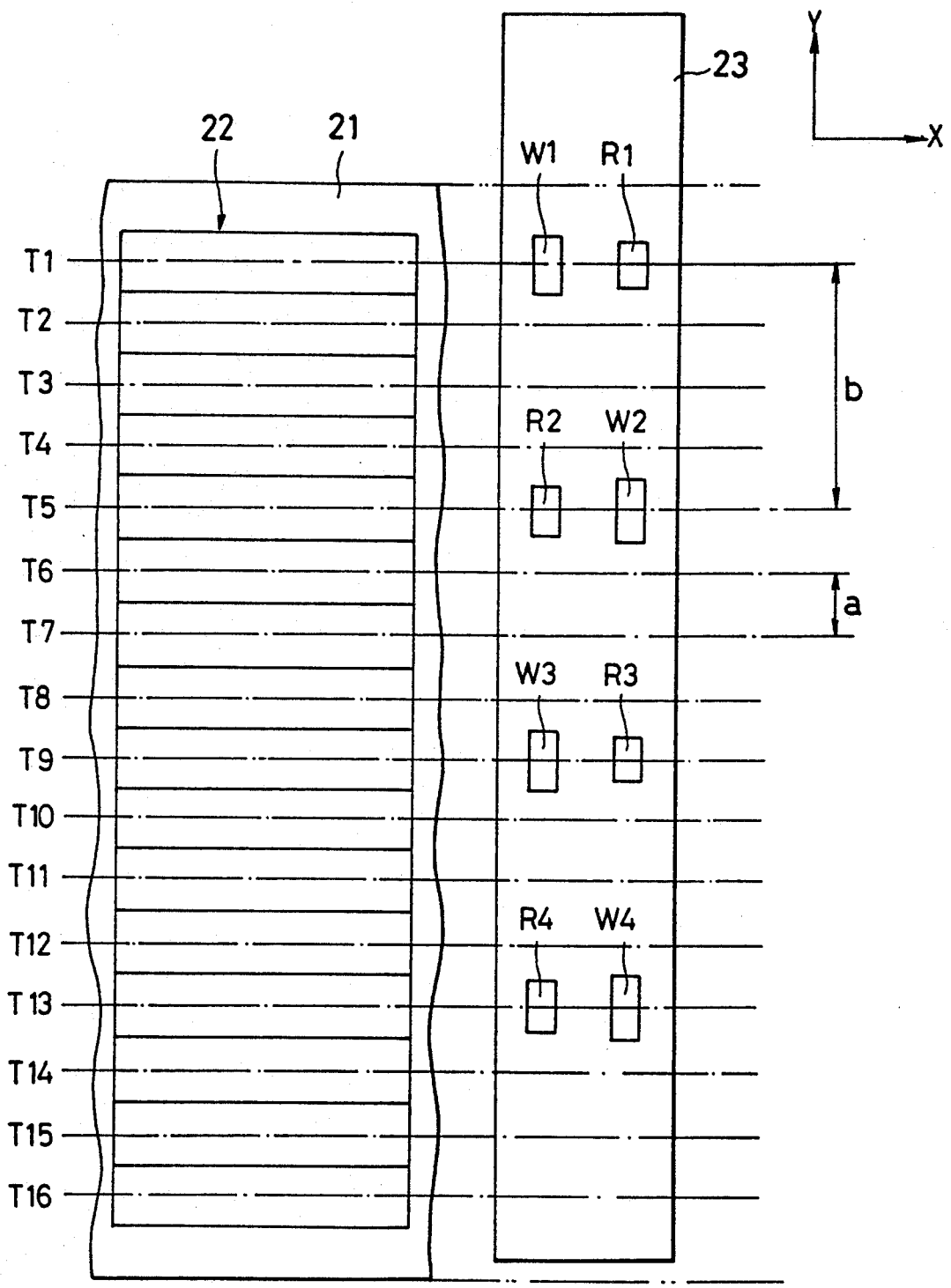
FIG. 1 illustrates a tracking control device of a conventional serpentine system magnetic recording/reproducing apparatus.

A first embodiment of the present invention will now be described with reference to FIGS. 2A, 2B and 3.

A magnetic recording/reproducing apparatus according to the first embodiment is used to serve as a backup storage device for, for example, a hard disk apparatus. The above-described apparatus employs a serpentine method which enables information to be recorded/reproduced from each of tracks by successively moving magnetic heads of the number which is smaller than the number of the tracks of the magnetic tape in the widthwise direction of the magnetic tape.

As shown in FIG. 2A, the magnetic recording/reproducing apparatus comprises, as a head unit, a combination head 3 having recording heads W1 to W8 and reproducing heads R1 to R8 (partially illustrated) which are formed as thin film heads on a pair of substrates 2a and 2b extending in direction Y which is the widthwise direction of a magnetic tape 1, the substrates 2a and 2b being adhered to each other. The combination head 3 can be moved in the direction Y or −Y by a drive means such as a voice coil type linear motor 17 (see FIG. 3).

As a magnetic tape 1, for example, a quarter-inch-wide tape is used. The magnetic tape 1 has 48 data tracks T1 to T48 extending in the direction Y and in parallel to the direction in which the magnetic tape 1 moves (in direction X), the magnetic tape 1 being formed at a predetermined track pitch c (for example, 120 μm). As a result, information can be recorded/reproduced along the 48 data tracks T1 to T48.

The substrate 2a is arranged to have odd recording heads W1, W3, W5 and W7 and even reproducing heads R2, R4, R6 and R8 which are respectively arranged alternately. The gaps of the heads formed on the substrate 2a are positioned on a straight line designated by a dashed line A.

The substrate 2B is arranged to have odd reproducing heads R1, R3, R5 and R7 and even recording heads W2, W4, W6 and W8 which are respectively arranged alternately. The gaps of the heads formed on the substrate 2b are positioned on a straight line designated by a dashed line B.

The above-described recording heads W1 to W8 and the reproducing heads R1 to R8 are respectively arranged in the direction X which is the direction in which the magnetic tape 1 moves so that magnetic head pairs H1 to H8 are formed. The X directional positions of the recording head and the reproducing head are alternated when viewed in the adjacent two magnetic head pairs. The Y directional length of the recording heads W1 to W8 and the reproducing heads R1 to R8 are the same referring to the drawing. However, the actual apparatus is arranged in such a manner that the width of a region to which information can be recorded by each of the recording heads W1 to W8 is arranged to be slightly larger than the width of a region from which information can be reproduced by each of the reproducing heads R1 to R8.

The Y directional interval d between the adjacent magnetic head pairs is arranged to be 6c (for example, 720 μm). The drive means comprising the voice coil type linear motor 17 moves, six times, the combination head 3 in the direction Y at each track pitch. The drive means performs six times the track switching operation, so that information can be recorded/reproduced from all of the data tracks T1 to T48.

A substrate 7 is positioned from a predetermined X directional distance from the substrate 2b. The substrate 7 has, at an end thereof, a servo recording portion 8 comprising six, which is the same number as that of the track switching operations, servo signal recording heads WS1 to WS6 in the direction Y. The Y directional length of each of the servo signal recording heads WS1 to WS6 and the intervals between the adjacent servo signal recording heads are respectively arranged to be the same as the pitch c of the data tracks T1 to T48.

Each of the servo signal recording heads WS1 to WS6 is arranged to cause servo tracking signals having different frequencies to be recorded to 6 servo tracks SV1 to SV6 (designated by hatched sections) positioned in the vicinity of the Y directional end of the magnetic tape 1. The frequencies of the servo signals to be recorded to the servo tracks SV1 to SV6 are arranged in such a manner that the difference in the frequencies of the servo signals to be recorded to the two adjacent servo tracks is sufficiently large as shown in Table 1.

TABLE 1

| Servo Track | Frequency |
|---|---|
| SV1 | 100 KHz |
| SV2 | 10 KHz |
| SV3 | 200 KHz |
| SV4 | 20 KHz |
| SV5 | 300 KHz |
| SV6 | 30 KHz |

A servo reproducing portion 5 is provided in a Y directional end portion of the substrate 2a. The servo reproducing portion 5 has two servo signal reproducing heads RS1 and RS2 arranged in the direction Y at the same interval as that of the track pitch c. The Y directional length e of each of the servo signal reproducing heads RS1 and RS2 is arranged to be a value which is slightly smaller than the track pitch c, for example, the length e is arranged to be 100 μm.

The above-described servo signal reproducing heads RS1 and RS2 are positioned at a reference position shown in FIG. 2A, that is, at positions at which the magnetic head pair H1 confronts the data track T1 so as to cover the upper portion and the lower portion of the servo track SV1 positioned at a Y directional end portion by the same width. As a result, the levels of the signals, which are reproduced from the servo track SV1 by the servo signal reproducing heads RS1 and RS2, are made to be the same. The gap of the servo signal reproducing head RS1 and that of the servo signal reproducing head RS2 are positioned on a straight line designated by a dashed line A.

Figure 3:
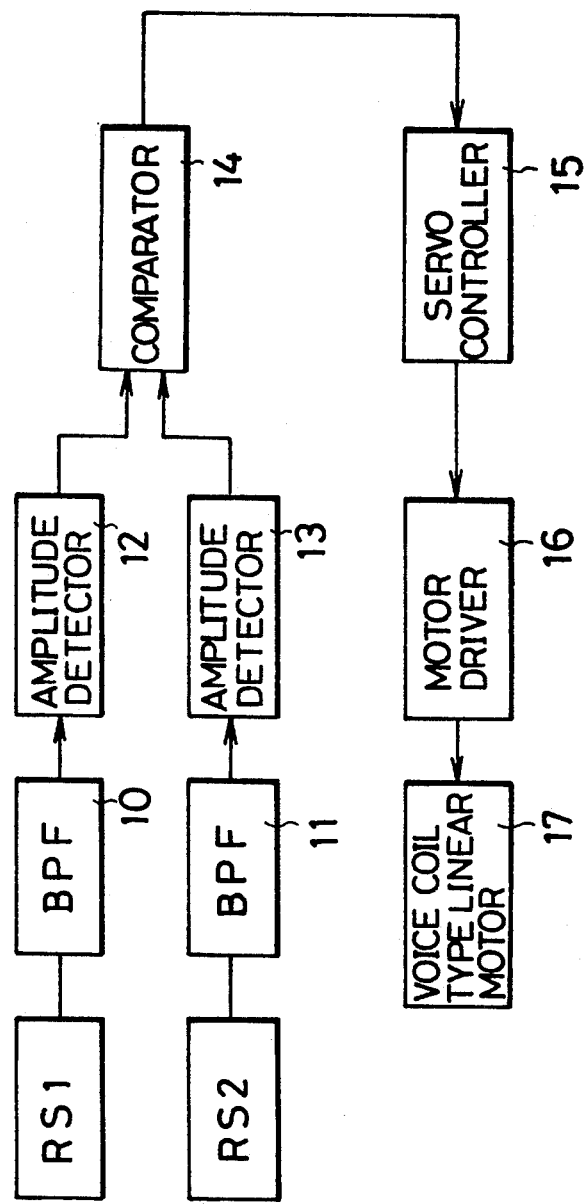
FIG. 3 is a block diagram which illustrates drive means of a tracking control device according to the first embodiment.

As shown in FIG. 3, the servo signal reproducing heads RS1 and RS2 are respectively connected to a comparator 14 via band pass filters (BPF) 10 and 11 and amplitude detectors 12 and 13. The BPFs 10 and 11 change their frequency characteristics for each of the servo tracks SV1 to SV6 so as to pass components having frequencies which approximate to the frequency of the servo signal among the servo signals, which have been recorded to the servo tracks SV1 to SV6, to be reproduced by the heads RS1 and RS2. Another structure may be employed in which the band pass filters 10 and 11 corresponding to the servo tracks SV1 to SV6 are selectively used.

The output from the comparator 14 is connected to a servo controller 15 the output from which is connected to the voice coil type linear motor 17 via a motor driver 16. The voice coil type linear motor 17 moves the servo reproducing portion 5 and the combination head 3 formed integrally with the servo reproducing portion 5 in the direction Y or −Y.

Although omitted from the illustration, a flange member for reducing the Y directional waving of the magnetic tape 1 to a degree about ±20 μm by restricting the widthwise ends of the magnetic tape 1.

Information is recorded to the magnetic tape 1 in such a manner that the magnetic tape 1 is moved in the direction X so as to record information by odd recording heads W1, W3, W5 and W7 to the data tracks T1, T13, T25 and T37 while recording servo signals by the servo signal recording heads WS1 to WS6 to the servo tracks SV1 to SV6 at frequencies shown in Table 1 or the same has been recorded. At this time, recorded information is immediately reproduced by the odd reproducing heads R1, R3, R5 and R7 to validate its contents. If there is an error, information is again recorded.

At this time, the servo signal is reproduced from the Y directional end servo track SV1 by two servo signal reproducing heads RS1 and RS2. The comparator 14 compares the amplitude of the signals reproduced by the servo signal reproducing heads RS1 and RS2 via band pass filters 10 and 11 which pass only the components in the vicinity of 100 KHz which is the frequency of the servo signal of the servo track SV1 and the amplitude detectors 12 and 13. The servo controller 15 rotates the voice type linear motor 17 via the motor driver 16 in accordance with the output from the comparator 14 so that the amplitude of the signal reproduced by the servo signal reproducing head RS1 and that reproduced by the servo signal reproducing head RS2 are made to be same. As a result, the combination head 3 is moved in the direction Y or −Y. Therefore, the odd number recording heads W1, W3, W5 and W7 follow the corresponding data tracks T1, T3, T25 and T37.

After information has been recorded to the X directional end along the data tracks T1, T13, T25 and T37, the magnetic tape is moved in the −X direction, information is recorded to data tracks T7, T19, T31 and T43 by even number recording heads W2, W4, W6 and W8. At this time, recorded information is immediately reproduced by the even reproducing heads R2, R4, R6 and R8 to validate its contents. Also at this time, the servo signal is reproduced from the servo track SV1 by the servo signal reproducing heads RS1 and RS2 so that the tracking control is similarly performed. Since the servo signals have been recorded to the servo tracks SV1 to SV6 in the forward movement of the magnetic tape 1, it is not necessary to record servo signals as the tape moves in the −X (reverse) direction.

Figure 2B:
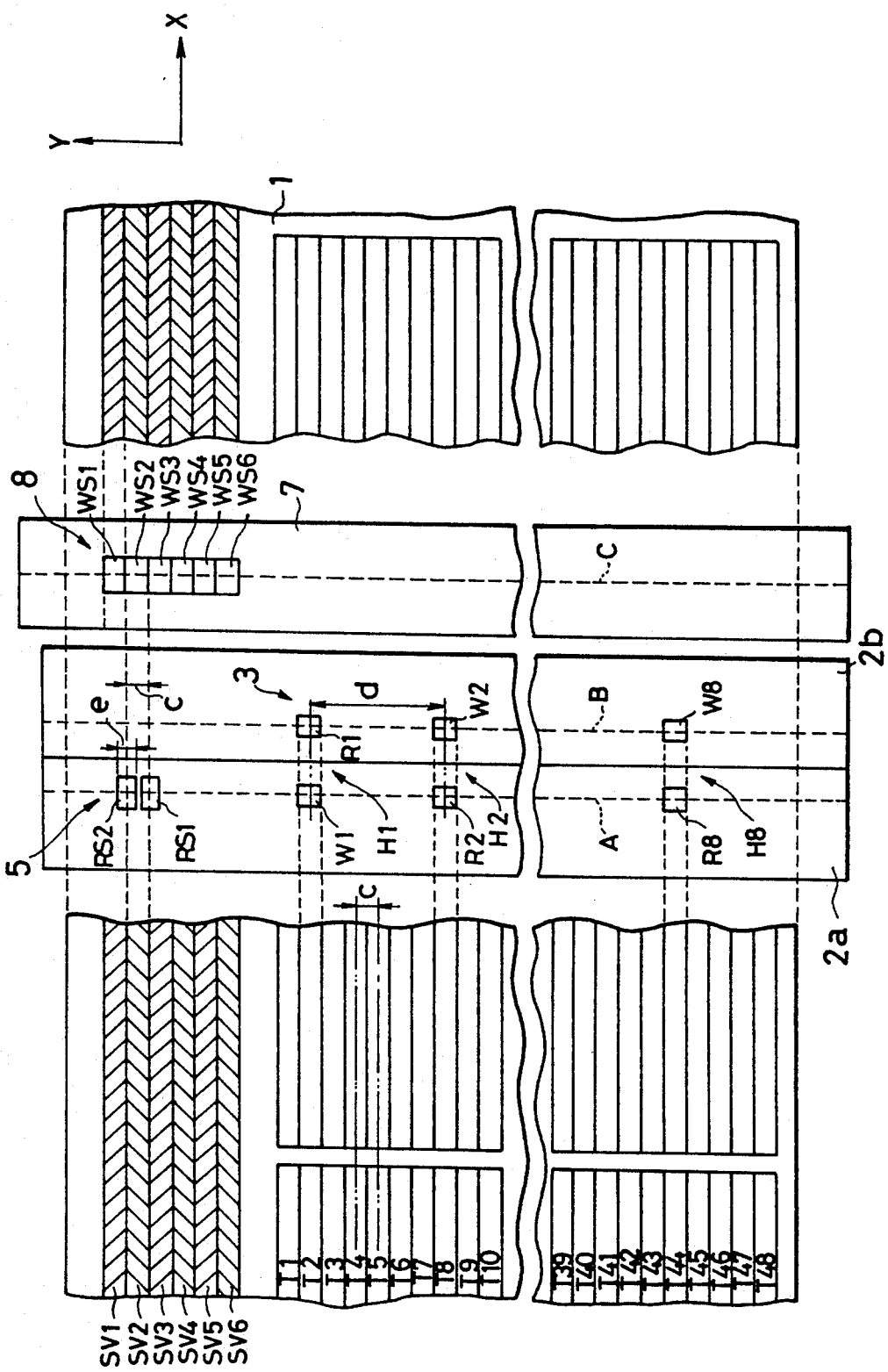

When the information recording operation reaches the −X directional end, the combination head 3 is moved in the −Y direction by the track pitch c as shown in FIG. 2B. As a result, information is recorded to the data tracks T2, T14, T26 and T38 by the odd recording heads W1, W3, W5 and W7 while moving the magnetic tape 1 in the direction X. At this time, the servo signal is reproduced from the servo track SV2 by the servo signal reproducing heads RS2 and RS3. In order to make the signals reproduced by the servo signal reproducing heads RS2 and RS3, tracking is performed by moving the combination head 3 in the direction Y or −Y by the voice coil type linear motor 17. At this time, the frequency characteristics of the band pass filters 10 and 11 are changed to the characteristics which allows only the components to pass, the components having the frequencies which are near 10 KHz which is the frequency of the servo signal of the servo track SV2. As an alternative to this, the BPFs 10 and 11 provided exclusively for the servo track SV2 may be selected.

When the information recording operation reaches the X directional end, the magnetic tape 1 is moved in the direction −X. As a result, information is recorded to the data tracks T8, T20, T32 and T44 by the even recording heads W2, W4, W6 and W8 while performing tracking in accordance with the outputs from the servo signal reproducing heads RS2 and RS3. Also at this time, the tracking is performed by the servo track SV2.

Then, the track is switched six times by combining, as shown in Table 2, the recording heads W1 to W8 and the data tracks T1 to T48 while similarly moving the combination head 3 in the direction −Y by the distance corresponding to the track pitch c whenever the magnetic tape 1 reciprocates and changing the subject servo track to the adjacent track when viewed in the direction −Y. As a result, information is recorded to all of the data tracks T1 to T48.

TABLE 2

| | Forward Passage | Reverse Passage |
|---|---|---|
| Track Switch I (SV1 is used) | W1-T1, W3-T13 W5-T25, W7-T37 | W2-T7, W4-T19 W6-T31, W8-T43 |
| Track Switch II (SV2 is used) | W1-T2, W3-T14 W5-T26, W7-T38 | W2-T8, W4-T20 W6-T32, W8-T44 |
| Track Switch III (SV3 is used) | W1-T3, W3-T15 W5-T27, W7-T39 | W2-T9, W4-T21 W6-T33, W8-T45 |
| Track Switch IV (SV4 is used) | W1-T4, W3-T16 W5-T28, W7-T40 | W2-T10, W4-T22 W6-T34, W8-T46 |

TABLE 2-continued

| | Forward Passage | Reverse Passage |
|---|---|---|
| Track Switch V (SV5 is used) | W1-T5, W3-T17 W5-T29, W7-T41 | W2-T11, W4-T23 W6-T35, W8-T47 |
| Track Switch VI (SV6 is used) | W1-T6, W3-T18 W5-T30, W7-T42 | W2-T12, W4-T24 W6-T36, W8-T48 |

The reproduction mode is arranged similarly to the recording mode in such a manner that the combination head 3 is moved in the direction −Y by a distance corresponding to the track pitch c whenever the magnetic tape 1 reciprocates once. Furthermore, information is reproduced from data tracks T1 to T48 while changing the subject servo track by the servo track positioned adjacently when viewed in the direction −Y.

Although the apparatus according to the first embodiment has the servo signal recording heads WS1 to WS6, the servo signal recording heads WS1 to WS6 can be omitted from the illustration by arranging the structure in such a manner that the servo signals are previously recorded to the servo tracks SV1 to SV6 when the magnetic tape 1 is manufactured.

According to the first embodiment, the number of the track changing operations is arranged to be 6, but the present invention is not limited to 6. In this case, the number of the servo tracks must be changed to correspond to the number of the track changing operations.

Figure 4A:
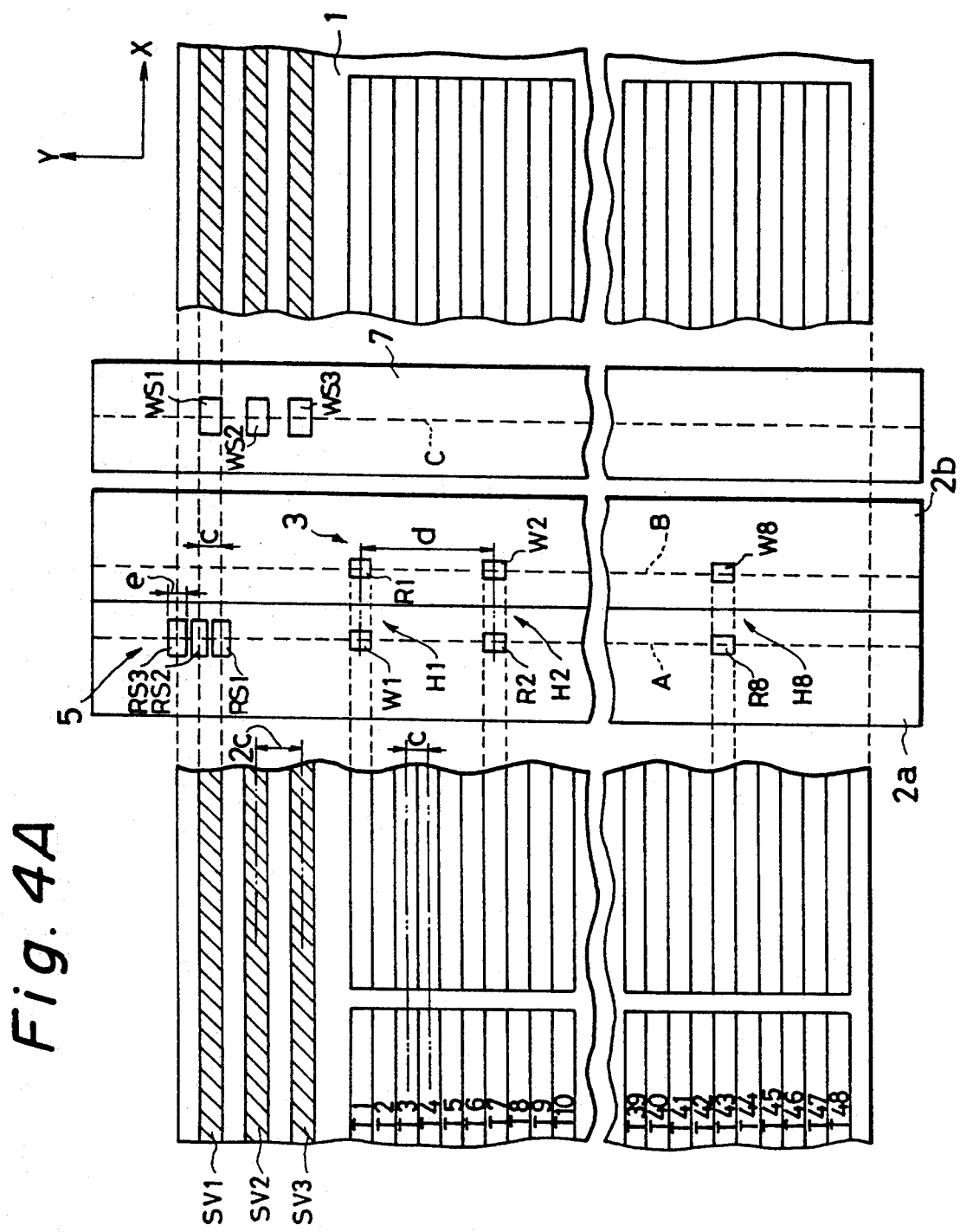

A modification to the first embodiment will be described with reference to FIGS. 4A and 4B.

According to this modification, the number of the track switching operations is arranged to be 6 similarly to the first embodiment. Furthermore, three servo signal recording heads WS1 to WS3 are provided in the servo recording portion 8 at a pitch (for example, a pitch of 240 μm) which is two times the track pitch of the data tracks T1 to T48. Three servo signal reproducing heads RS1 to RS3 for reproducing information from the servo tracks SV1 to SV3 are provided in the servo reproducing portion 5 at a pitch (for example, 120 μm) which is the same pitch as the track pitch c. As a result, when the magnetic head pair H1 confronts the data track T1, the two servo signal reproducing heads RS1 and RS2 respectively cover the upper portion of the servo track SV1 and the lower portion of the same. The same elements as those according to the first embodiment are given the same reference numerals and descriptions are omitted here.

Since information is, according to the thus arranged structured modification, recorded similarly to the first embodiment, only the procedure of the tracking operation will be described.

In the first reciprocation operation of the magnetic tape, that is, at the track switch position at which the recording head W1 and the reproducing head R1 confront the data track T1, the servo reproducing heads RS1 and RS2 reproduces servo signals from the servo track SV1. The two reproduced signals are subjected to a comparison so that the tracking is performed.

TABLE 3

| Track Switch Position | Subject Servo Track | Servo signal Reproducing Head |
|---|---|---|
| I | SV1 | RS1, RS2 |
| II | SV1 | RS2, RS3 |
| III | SV2 | RS1, RS2 |
| IV | SV2 | RS2, RS3 |
| V | SV3 | RS1, RS2 |

TABLE 3-continued

| Track Switch Position | Subject Servo Track | Servo signal Reproducing Head |
|---|---|---|
| VI | SV3 | RS2, RS3 |

In the second reciprocation operation, that is, at the track switch position at which the recording head W1 and the reproducing head R1 confront the data track T2, servo signal SV1 is, as shown in FIG. 4B, reproduced from the servo track SV1 by the servo signal reproducing head RS2 and RS3. The reproduced servo signal SV1 is subjected to a comparison so that tracking is performed.

Then, the third and the ensuing reciprocation operation is similarly performed in such a manner that the servo track and the servo signal reproducing head are successively switched in accordance with Table 3 so that tracking at each track switch positions is performed.

Figure 5B:
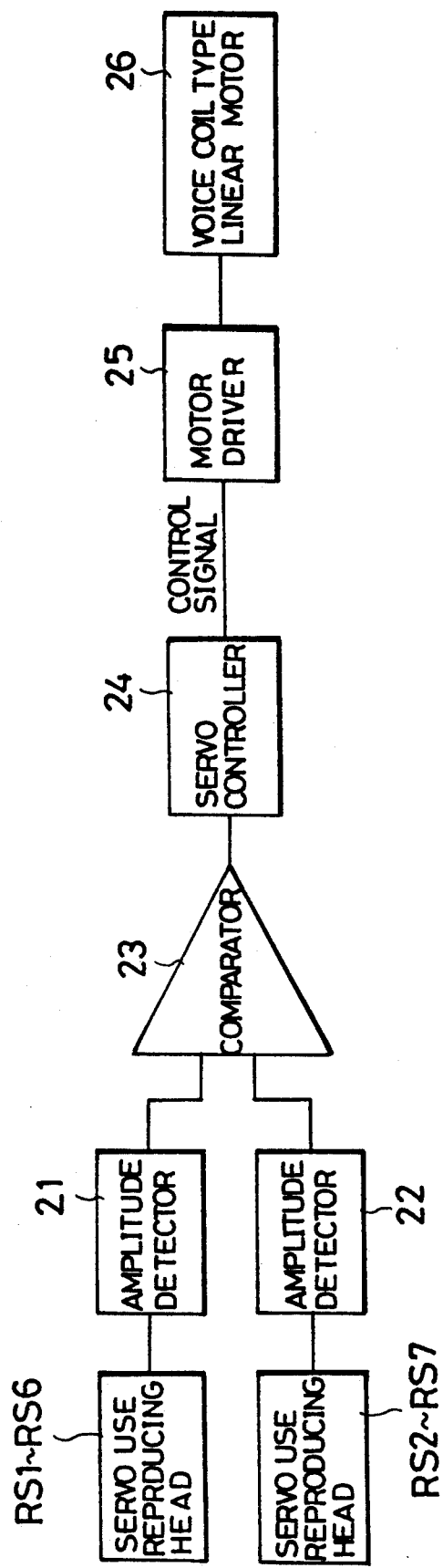
FIG. 5B is a block diagram of a drive means of the tracking control device according to the second embodiment.
Figure 5C:
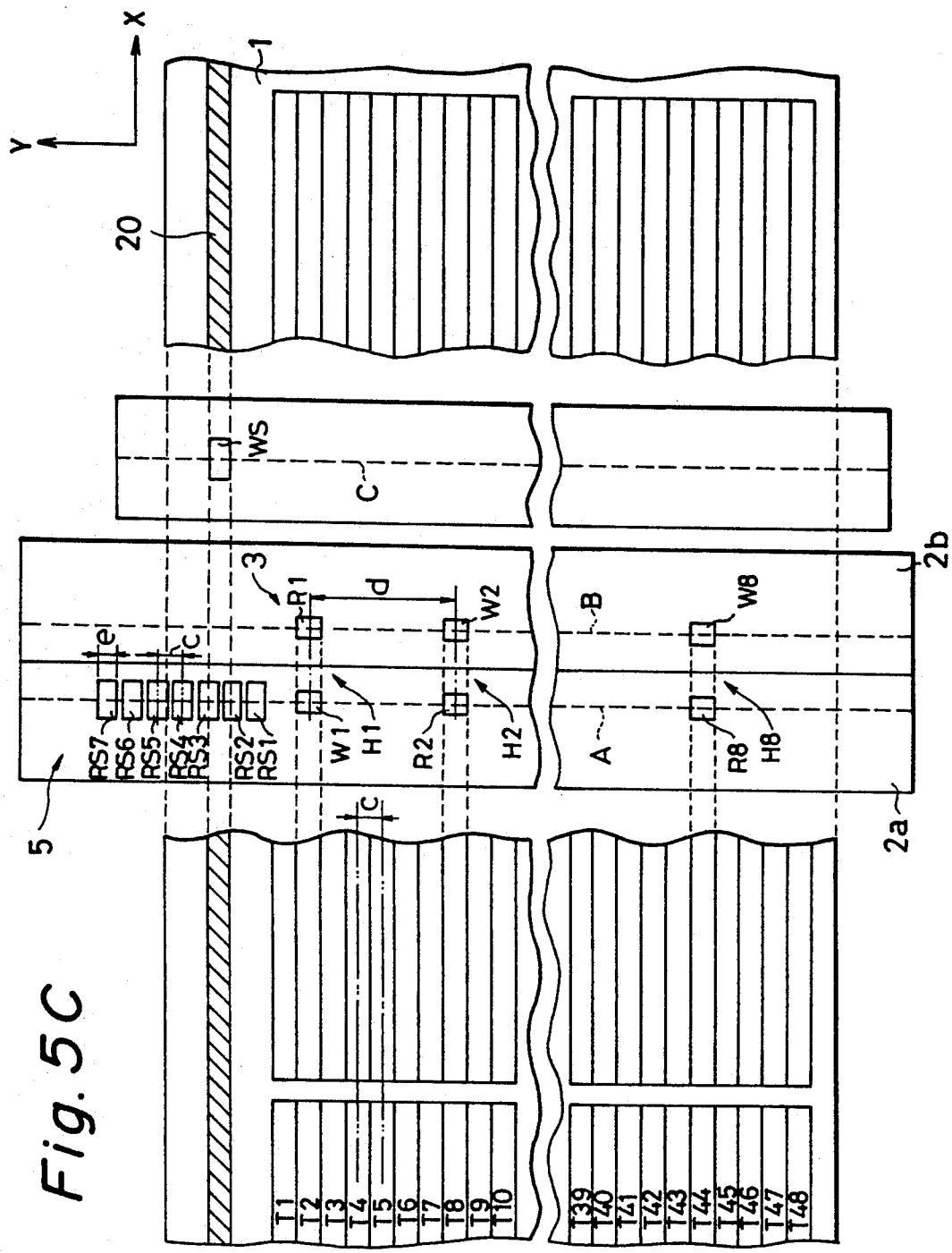

A second embodiment of the present invention will be described with reference to FIGS. 5A, 5B and 5C. The same elements, which are the same as those according to the first embodiment, are given the same reference elements and their descriptions are omitted from here. As shown in FIG. 5A, a servo signal recording head WS is provided in the vicinity of the widthwise end portion of the magnetic tape 1 so as to record the servo signal to the servo track 20 (designated by hatching for convenience) formed in parallel to the data tracks T1 to T48. The gap of the servo signal recording head WS is positioned on dashed line C. The servo reproducing portion 5 has 7 servo reproducing heads RS1 to RS7 respectively arranged at same intervals which are the same as the track pitch c and in the direction Y. The number of the servo signal reproducing heads 7 is arranged to be the number which is larger than the number of the track switching operations by one. According to this embodiment, since the number of the track switching operations is arranged to be 6, seven servo reproducing heads RS1 to RS7 are provided. The servo signal reproducing heads RS1 to RS7 are positioned in such a manner that the heads RS1 and RS2 respectively cover the lower portion and the upper portion of the servo track 20 by the same widths in order to make the levels of the signals reproduced from the servo track 8 by the heads RS1 and RS2 when the recording head W1 and the reproducing head R1 confront the data track T1.

As shown in FIG. 5B, any of the outputs from the servo signal reproducing head pairs RS1/RS2, RS2/RS3, . . . for use at each of the track switch position is received by amplitude detectors 21 and 22. The outputs from the amplitude detectors 21 and 22 are received by a comparator 23, the output from the comparator 23 being received by a servo controller 24. The servo controller 24 acts to rotate a voice coil type linear motor 26 via a motor driver 25.

FIG. 5A illustrates a status where information is recorded or reproduced from tracks T1, T7, T13, T19, T25, T31, T37 and T43 by using heads RS1 and RS2. FIG. 5C illustrates a status where information is recorded or reproduced from tracks T2, T8, T14, T20, T26, T32, T38 and T44 by using heads RS2 and RS3. Since the recording and the reproducing operations are substantially the same as those according to the first embodiment, their descriptions are omitted here.

According to this embodiment, the servo signal recording head WS for recording the servo signal is provided in the servo track 20, the servo signal recording head WS can be omitted from illustration in a case where the structure is arranged in such a manner that the servo signal is previously recorded to the servo track 20 at the time of manufacturing the magnetic tape 1.

Six track switching operations can optionally be arranged. In this case, the number of the servo signal reproducing heads must be larger than the track switching operation by one.

The second embodiment is arranged in such a manner that the servo signal reproducing heads RS1 to RS7 are provided on the substrate 2a on which the recording and reproducing heads are provided. However, another structure may be employed which is arranged in such a manner that the servo signal reproducing heads RS1 to RS7 are provided on the substrate 2b or on another substrate except for the substrates 2a and 2b so as to be adhered to the substrates 2a and 2b.

A modification to the second embodiment will be described with reference to FIG. 6. According to this embodiment, odd servo signal reproducing heads RS1, RS3, RS5 and RS7 are disposed on the substrate 2a, while even servo signal reproducing heads RS2, RS4, RS6 are disposed on the substrate 2b. Furthermore, the gap of each of odd servo reproducing heads RS1, RS3, RS5 and RS7 is positioned on dashed line A, while the gap of each of even servo reproducing heads RS2, RS4 and RS6 is positioned on dashed line B. As a result, the degree of integration of the servo reproducing heads RS1 to RS7 can be moderated. Therefore, the servo reproducing heads RS1 to RS7 in the form of the thin film head can easily be manufactured.

A third embodiment will be described with reference to FIGS. 7A, 7B and 7C. According to this embodiment, the same elements which are the same as those according to the first and the second embodiments are given the same reference numerals and their descriptions are omitted here.

According to the third embodiment, the servo signal recording head WS for recording the servo signal along a widthwise directional end portion 30 of the magnetic tape 1 is provided at an end portion of the substrate 7.

The servo reproducing portion 5 has six servo signal reproducing heads RS1 to RS6 arranged in the direction Y at intervals each of which is the same as the track pitch c. The number of the servo signal reproducing heads RS1 to RS6 is arranged to the same as the number of the track switching operation. Since the number of the track switching operation is arranged to be six according to this embodiment, six servo reproducing heads RS1 to RS6 are provided. The gaps of the servo signal reproducing heads RS1 to RS6 are positioned on a straight line designated by dashed line A.

Figure 7B:
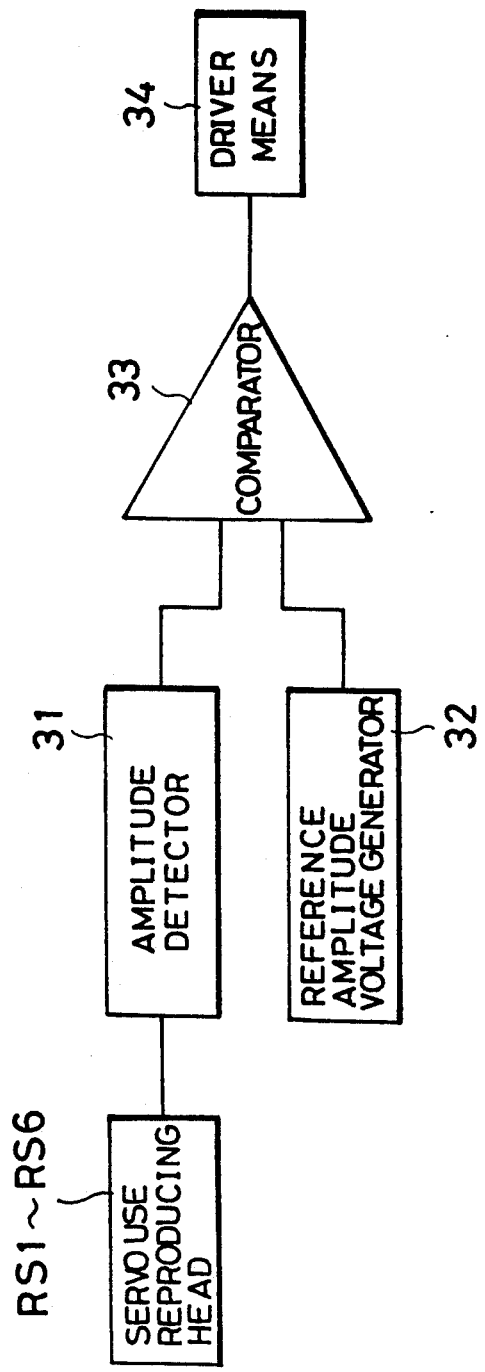
FIG. 7B is a block diagram of a drive means of the tracking control device according to the third embodiment.
Figure 7C:
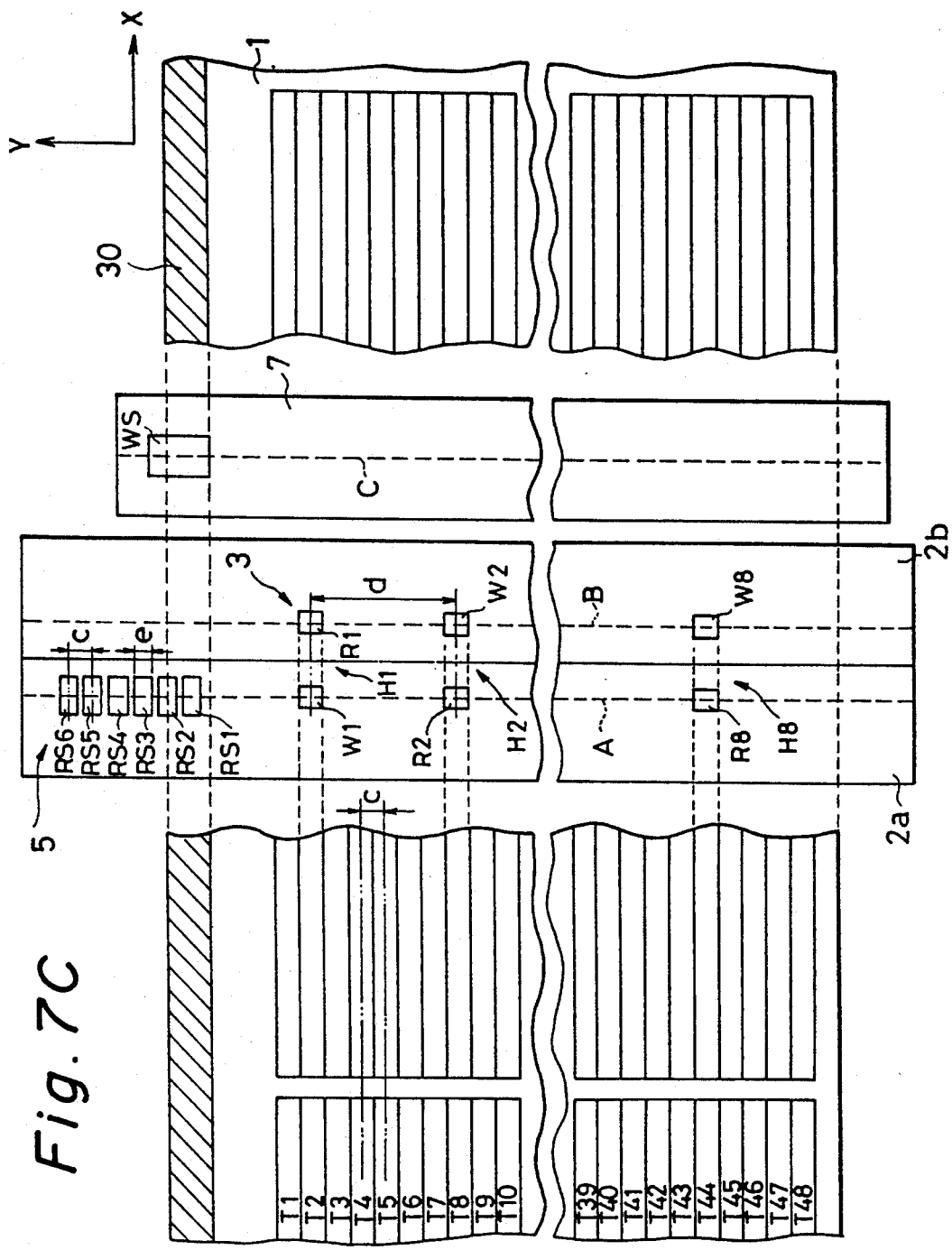

A control means is, as shown in FIG. 7B, arranged in such a manner that a drive means 14 moves the combination head 3 in the direction Y in accordance with the outputs from the corresponding servo reproducing heads RS1 to RS6 so as to guide the magnetic head pairs H1 to H8 to the central portion of the corresponding tracks.

The control means comprises an amplitude detector 31 for detecting the amplitude of the output from any of the head among the servo signal reproducing heads RS1 to RS6 which is being used. The control means further comprises a reference amplitude voltage generator 32 for generating reference amplitude voltage and a comparator 33 for generating an error signal by comparing the output levels with each other. A drive means 34 moves the servo signal reproducing heads RS1 to RS6 and the combination head 3 in the direction Y or −Y in response to the error signal transmitted from the comparator 33. As a result, a desired track selected from the tracks T1 to T4 is followed. The drive means 34 may comprise, for example, a voice coil type linear motor.

FIGS. 7A illustrates a state where information is recorded or reproduced from the tracks T1, T7, T13, T19, T25, T31, T37 and T43 by using the head RS1. FIG. 7C illustrates a state where information is recorded or reproduced from the tracks T2, T8, T14, T20, T26, T32, T38 and T44 by using the head RS2. Since the recording and reproducing operations are the same as those according to the first and the second embodiments, their description are omitted here.

According to the third embodiment, the servo signal recording head WS for recording the servo signal is provided in the servo track 20, the servo signal recording head WS can be omitted from illustration in a case where the structure is arranged in such a manner that the servo signal is previously recorded at the time of manufacturing the magnetic tape 1.

FIG. 8A illustrates a first modification of the third embodiment.

This modification is arranged in such a manner that servo signal recording heads Wa and Wb are respectively provided at the widthwise end portions of the substrate 7 so as to record the servo signals to two servo regions 30a and 30b at the widthwise end portions of the magnetic tape 1. A servo reproducing portion 5a is provided at either end portion, the servo signal reproducing portion 5a having six servo signal reproducing heads RS1a to RS6a which correspond to the six track switching operations. The servo signal reproducing heads RS1a to RS6a are arranged in the widthwise direction of the magnetic tape 1 at same intervals each of which is the same as the track pitch c. On the other hand, a servo reproducing portion 5b is provided at the Y directional end portion of the magnetic tape 1, the servo signal reproducing portion 5b having servo signal reproducing heads RS1b to RS6b which correspond to the six track switching operations. The servo signal reproducing heads RS1b to RS6b are arranged in the widthwise direction of the magnetic tape 1 at same intervals each of which is the same as the track pitch c. The servo signal reproducing heads RS1a to RS6a correspond to RS1b to RS6b so that, when, for example, RS1a is positioned at either of the widthwise directional ends of the magnetic tape 1, the corresponding head RS1b confront another end of the magnetic tape 1.

According to this modification, when information is recorded to the magnetic tape 1, the servo signals are recorded to servo regions 30a and 30b at the widthwise end portions of the magnetic tape 1 by the servo signal recording heads WSa and WSb while moving the magnetic tape 1 in the direction X. Simultaneously or after the servo signal has been recorded as described above, information is recorded to the tracks T1, T13, T25 and T37 by the odd recording heads W1, W3, W5 and W7. At this time, the amplitude of the servo signal reproduced by the servo signal reproducing head RS1a and the amplitude of the servo signal reproduced by the servo signal reproducing head RS1b are respectively detected by amplitude detectors 35 and 36 (see FIG. 8B) so as to be subjected to a comparison by the comparator 33. Then, the drive means 34 performs tracking so as to make the above-described two amplitudes to be the same. Then, the track switching operations are successively performed similarly to the first embodiment so that information is recorded to all of the tracks T1 to T48. In also the reproducing mode, the track switching operation is performed and the tracking is also performed similarly to the recording mode.

Since the first modification is arranged in such a manner that the outputs from the pair of the servo signal reproducing heads are subjected to the comparison, they can be compensated to each other. Therefore, an effect can be obtained in that the tracking can accurately be performed if the magnetic characteristics of the magnetic tape 1 are changed.

A second modification of the third embodiment will be described with reference to FIG. 9. This modification is arranged in such a manner that the odd servo signal reproducing heads RS1, RS3, RS5 are disposed on the substrate 2a, while even servo signal reproducing head RS2, RS4 and RS6 are disposed on the substrate 2b. As a result, the degree of integration of the servo signal reproducing heads can be moderated so that the servo reproducing heads RS1 to RS6 in the form of the thin film head can easily be manufactured.

Figure 10:
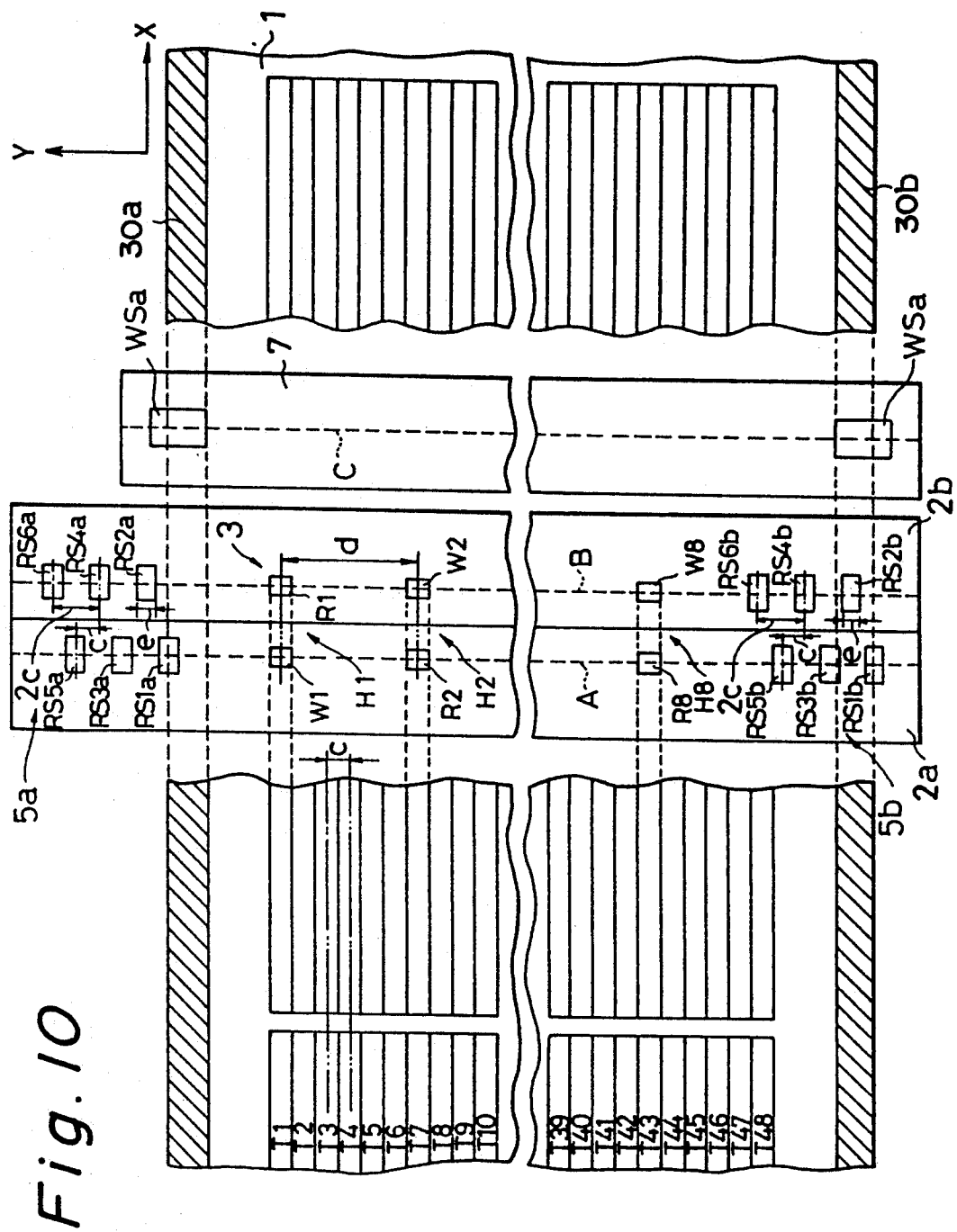
FIG. 10 illustrates a third modification to the third embodiment of the tracking control device.

FIG. 10 illustrates a third modification of the third embodiment. The third modification is arranged in such a manner that the servo reproducing heads RS1a to RS6a and RS1b to RS6b according to the first modification are disposed such that the odd heads are disposed on the substrate 2a and the even heads are disposed on the substrate 2b. Similarly to this second modification, the degree of integration of the servo signal reproducing heads can be moderated so that the combination head can easily be manufactured.

According to the third embodiment, the servo signal reproducing heads RS1 to RS6 (RS1a to RS6a and RS1b to RS6b) are disposed so as to reproduce the servo signal from the tape edge portion of the servo region 30 (30a and 30b). The servo signal reproducing heads RS1 to RS6 (RS1a to RS6a and RS1b to RS6b) may be disposed so as to reproduce the servo signal from the tape center portion of the servo region 8 (8a and 8b).

Figure 11:
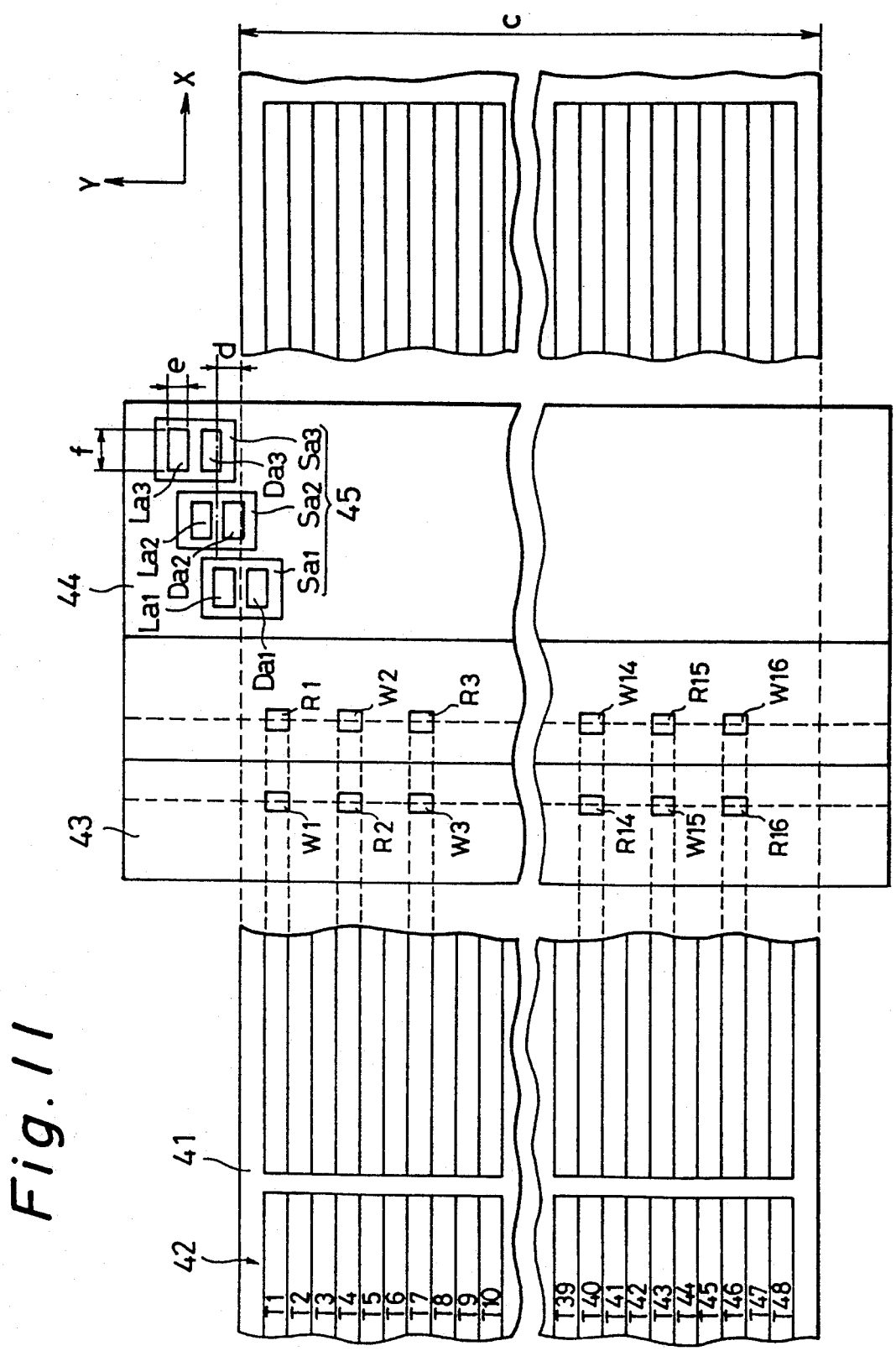
FIG. 11 illustrates a fourth embodiment of the tracking control device according to the present invention.

A fourth embodiment of the present invention will be described with reference to FIGS. 11 and 12.

A tracking control device according to the fourth embodiment comprises a combination head 43 for recording/reproducing information to a magnetic tape 41. The combination head 43 has a reflecting type photointerrupter holding member 44.

The magnetic tape 41 has a track group 42 composed of 48 tracks T1 to T48 formed in the direction Y at the same intervals. According to this embodiment, width C of the magnetic tape 1 is arranged to be ¼ inch and the track pitch is arranged to be 120 μm. The waving of the magnetic tape 41 is restricted to ±50 μm or less by flanges (omitted from illustration) which restrict the ±Y directional end portions of the magnetic tape 41.

The combination head 43 recording heads W1 to W16 in the form thin films and reproducing heads R1 to R16. The recording heads W1 to W16 are disposed in the direction Y at a pitch of 360 μm. The reproducing heads R1 to R16 are arranged in the direction X or −X to correspond to the recording heads W1 to W16. When the magnetic tape 1 is moved in the direction X, information is recorded by 8 recording heads W1, W3, W5, W7, W9, W11, W13 and W15. When the magnetic tape 1 is moved in the direction −X, information is recorded by 8 recording heads W2, W4, W6, W8, W10, W12, W14 and W16. Furthermore, the combination head 43 is moved in the direction −Y whenever the magnetic tape 41 reciprocates once. After the magnetic tape 41 has reciprocated three times, that is after the track switching operation has been performed three times, information can be recorded/reproduced from all of the 48 tracks T1 to T48.

The reflecting type photointerrupter holding member 44 has a reflecting type photointerrupter group 45 at a position confronting either of the +Y directional end of the magnetic tape 41, the reflecting type photointerrupter group 45 being composed of three reflecting type photointerrupters Sa1 to Sa3. As a result, light emitted from light emitting devices La1 to La3 is reflected by the magnetic tape 41 so as to be detected by light receiving devices Da1 to Da3. The light receiving devices Da1 to Da3 are positioned adjacent to the magnetic tape 1 while the light emitting devices La1 to La3 are positioned away from the magnetic tape 1.

The number of the reflecting type photointerrupters of the reflecting type photointerrupter group 45 is the same as the number of the tracks (T1 to T3) positioned in a range in which the pair of the recording head and the reproducing head, that is, the recording head W1 and the reproducing head R1 are able to move. Since the reflecting type photointerrupter holding member 44 is integrally formed with the combination head 43, the reflecting type photointerrupters Sa1 to Sa3 are able to move in accordance with the movement of the combination head 43 in the direction ±Y. The length e of the light emitting device is arranged to be 100 $\mu$m. The reflecting type photointerrupters Sa1 to Sa3 are disposed in the direction +Y at pitch d (d=120 $\mu$m) which is the same as the track pitch of the magnetic tape 1 in such a manner that they are shifted in the direction +X so as not to overlap each other. The reflecting type photointerrupter Sa1 is positioned in such a manner that the intermediate position between the light receiving device Da1 of the reflecting type photointerrupter Sa1 and the light emitting device La1 aligns with the +Y directional end of the magnetic tape 1 when the recording head W1 and the reproducing head R1 are positioned to confront the track T1.

Figure 12:
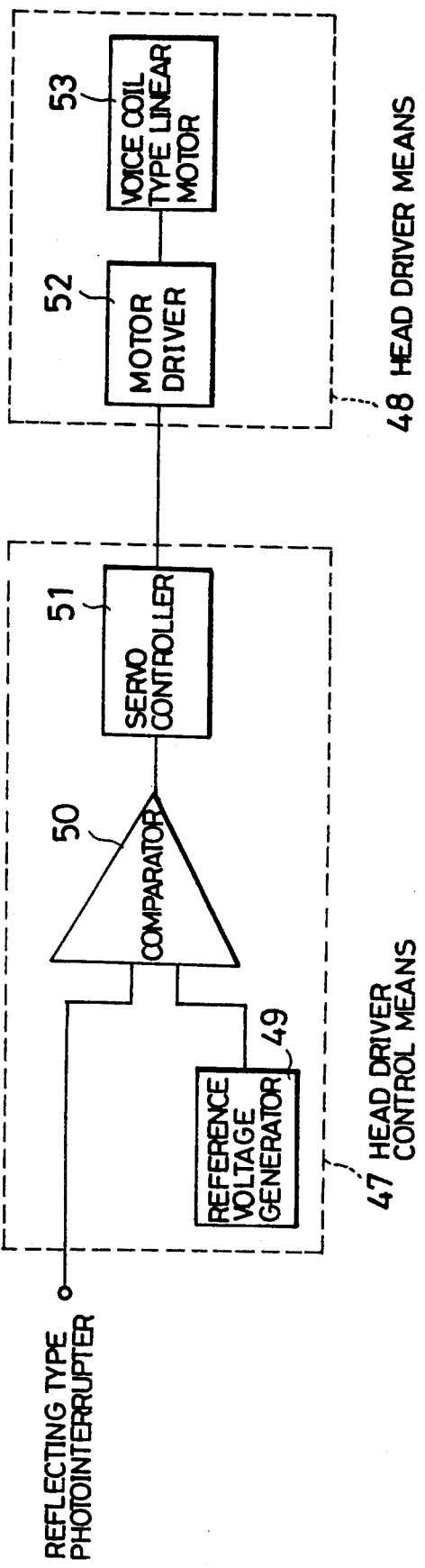
FIG. 12 is a block diagram of a drive means of the tracking control device according to a the fourth embodiment.

The reflecting type photointerrupters Sa1 to Sa3 are, as shown in FIG. 12, connected to a head drive means 48 via a head drive control means 47. The head drive control means 47 comprises a reference voltage generator 49, a comparator 50 and a servo controller 51. The head drive means 48 comprises a motor driver 52 and a voice coil type linear motor 53. The comparator 50 compares the output from any of the reflecting type photointerrupters Sa1 to Sa3 and a predetermined reference level transmitted from the reference voltage generator 49. In order to make the difference, which is the result of the comparison, to be zero, a control signal is supplied from the servo controller 51 to the motor driver 52. As a result, the motor driver 52 rotates the voice coil type linear motor 53 so that the position of the combination head 43 is feedback-controlled. Thus, the head drive means 48 moves the combination head 43 in the ±Y direction of the magnetic head 41 so as to make the relative position between the magnetic tape 41 and the combination head 43 to be at a desired position.

When the above-described magnetic recording/reproducing apparatus reproduces data from all of the tracks T1 to T48, the combination head 43 is driven by the head drive means 48. As a result, the reproducing head R1 and the track T1, the reproducing head R3 and the track T7, the reproducing head R5 and the track T13, the reproducing head R7 and the track T19, the reproducing head R9 and the track T25, the reproducing head R11 and the track T31, the reproducing head R13 and the track T37 and the reproducing head R15 and the track T43 respectively confront each other. At this time, the head drive control means 47 causes the head drive means 48 to move the combination head 43 so as to make the difference between the output from the reflecting type photointerrupter Sa1 and the predetermined reference level to be zero. Furthermore, the combination head 43 is allowed to follow the waving of the magnetic tape 41 so that the relative position between the magnetic tape 41 and the combination head 43 is maintained at constant When the magnetic tape 41 is moved in the direction X in this state, data is reproduced from tracks T1, T7, T13, T19, T25, T31, T37 and T43 by the reproducing heads R1, R3, R5, R7, R9, R11, R13 and R15. After the data has been reproduced from the end of the magnetic tape 1, the magnetic tape 1 is moved in the direction −X, so that data is reproduced from the tracks T4, T10, T16, T22, T28, T34, T40 and T46 by the reproducing heads R2, R4, R6, R8, R10, R12, R14 and R16.

After the data reproduction for one reciprocating operation has been completed, the combination head 43 is moved by the head drive means 48. As a result, the reproducing head R1 and the track T2, the reproducing head R3 and the track T8, the reproducing head R5 and the track T14, the reproducing head R7 and the track T20, the reproducing head R9 and the track T26, the reproducing head R11 and the track T32, the reproducing head R13 and the track T38 and the reproducing head R15 and the track T44, respectively confront each other. At this time, the head drive control means 47 causes the head drive means 48 to move the combination head 43 in order to make the difference between the output from the reflecting type photointerrupter Sa2 and a predetermined reference level to be zero. When the magnetic tape 41 is moved in the direction X in this state, data is reproduced from the tracks T2, T8, T14, T20, T26, T32, T38 and T44 by the reproducing heads R1, R3, R5, R7, R9, R11, R13 and R15. Then, the magnetic tape 41 is moved in the direction −X, data is reproduced from tracks T5, T11, T17, T23, T29, T35, T41 and T47. When data is reproduced from the tracks T3, T9, T15, T21, T27, T33, T39 and T45 and T6, T12, T18, T24, T30, T36, T42 and T48, the combination head 43 is moved in order to make the difference between the output from the reflecting type photointerrupter Sa3 and a predetermined reference level to be zero. As a result, the track switching operation and the track following operation are performed so that data reproduction from all of the tracks T1 to T48 is completed by the three times of the reciprocation motion of the magnetic tape 41. The recording operation is similarly performed.

Figure 13:
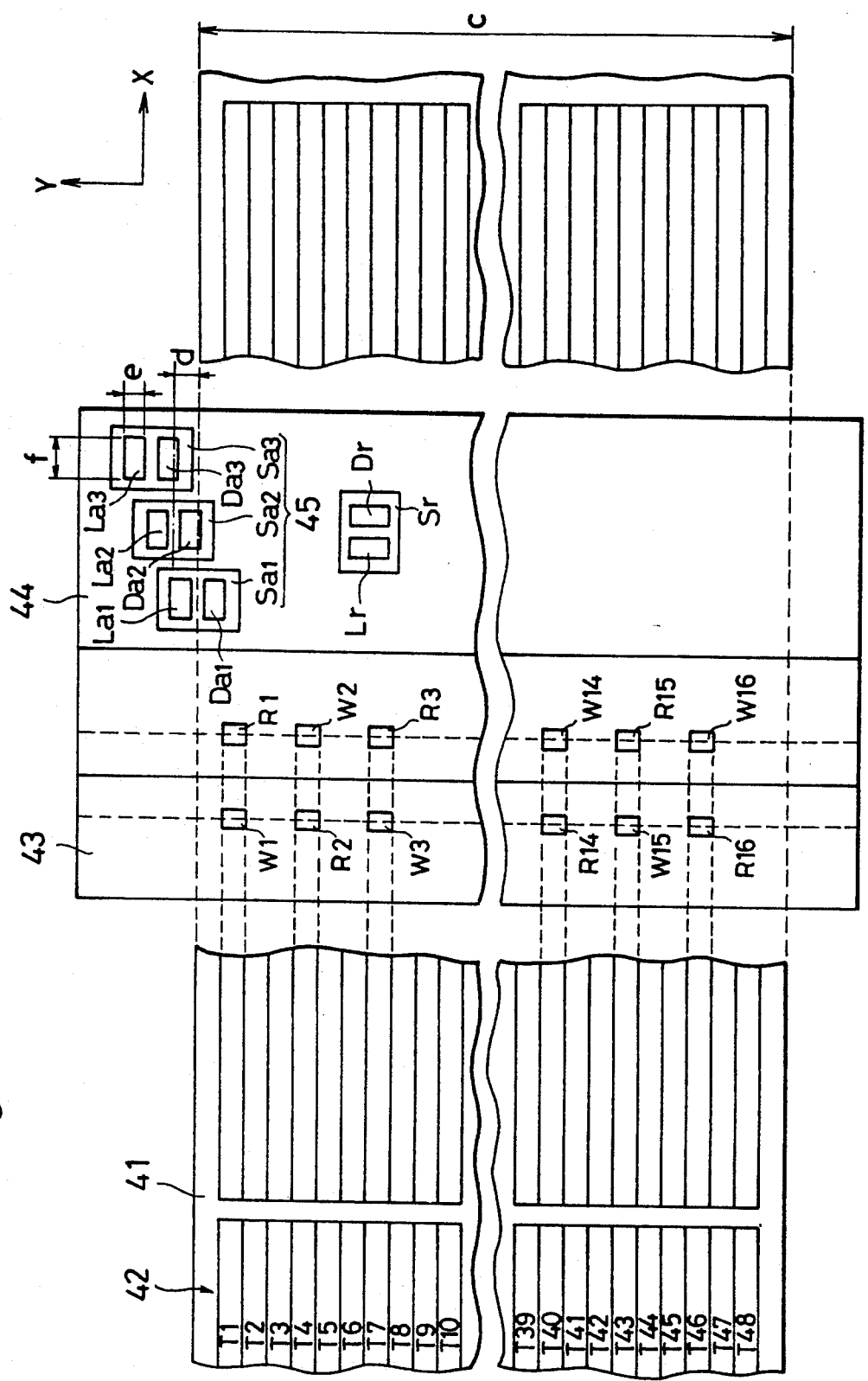
FIG. 13 illustrates a first modification to the fourth embodiment of the tracking control device.

Then, a first modification to the fourth embodiment of the present invention will be described with reference to FIG. 13. According to the first modification, a photointerrupter Sr for the reference output is disposed at a position which confronts a proper position of the magnetic tape 41 except for its end portion. A light receiving device Dr of the reflecting type photointerrupter Sr for the reference output is disposed on the +X side while a light emitting device Lr is disposed on the −X side.

The reflecting type photointerrupter Sr for the reference output is provided for the purpose of always monitoring reflection from the surface of the magnetic tape 1. In accordance with the output denoting the monitored surface reflection, the output from each of the reflecting type photointerrupter Sa1 to Sa3 is corrected. Therefore, the tracking control cannot be influenced even if the output from each of the reflecting type photointerrupters Sa1 to Sa3 due to the change in the reflectance or the ambient temperature.

As an alternative to the structure arranged in such a manner that the output from each of the reflecting type photointerrupters Sa1 to Sa3 in accordance with the output from the reflecting type photointerrupter Sr for the reference output, the reference level may be corrected. Furthermore, another structure may be employed in which the feedback control is performed so as to make the output from each of the reflecting type photointerrupters Sa1 to Sa3 to be the half of the reflecting type photointerrupter Sr for the reference output.

Figure 14:
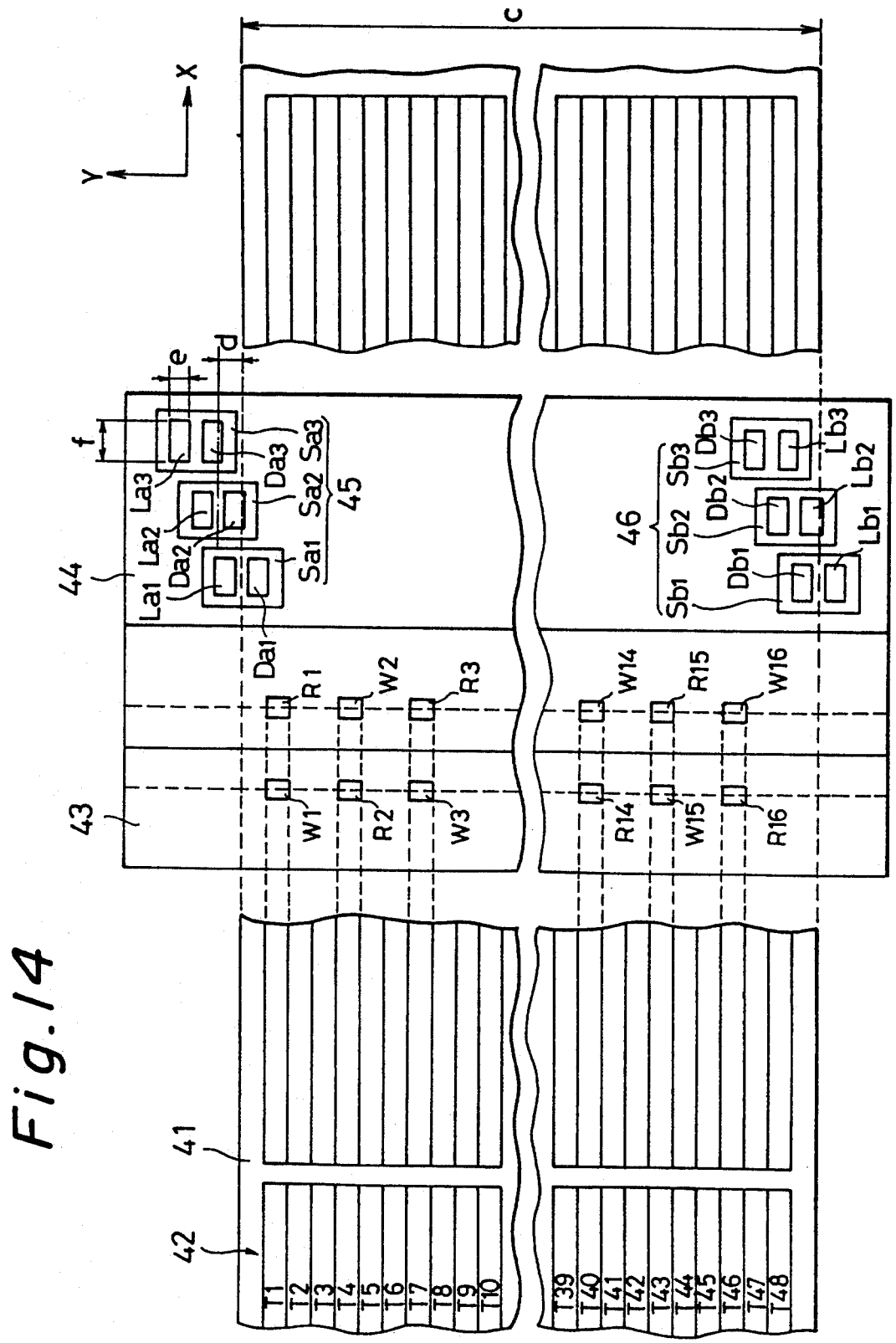
FIG. 14 illustrates a second modification to the fourth embodiment of the tracking control device.

A second modification of the fourth embodiment will be described with reference to FIG. 14. The second modification is arranged in such a manner that a reflecting type photointerrupter group 6 composed of three reflecting type photointerrupters Sb1 to Sb3 is provided at positions which correspond to the −Y directional end of the magnetic tape 41 in addition to the above-described reflecting type photointerrupter group 45. The reflecting type photointerrupter Sa1 and the reflecting type photointerrupter Sb1 are shifted from each other by a distance which corresponds to the width of the magnetic tape 41, that is, by ¼ inch in the direction Y. The reflecting type photointerrupters Sa1 and Sb1 are positioned in such a manner that their centers coincides with each end portion of the ±Y directional ends of the magnetic tape 1 when the recording head W1 and the reproducing head R1 are positioned to confront the track T1.

The feedback control is performed in such a manner that the difference between the outputs from the reflecting type photointerrupter pairs Sa1 and Sb1, Sa2 and Sb2, and Sa3 and Sb3 is made to be zero. As a result, the head drive means moves the combination head 43 in the ±Y direction of the magnetic tape 41 so that the relative position between the magnetic tape 41 and the combination head 43 is held at a predetermined position. The apparatus according to the second modification reveals an advantage in that an influence from the reflectance of the magnetic tape or the temperature of the reflecting type photointerrupter can be relatively prevented with respect to the apparatus according to the first modification. Furthermore, the track switching operation and the track following operation can further stably be performed.

The above-described embodiments and the modifications are arranged in such a manner that the light receiving devices Da1 to Da3 and Db1 to Db3 are positioned adjacently to the magnetic tape 41 and the light emitting devices La1 to La3 and Lb1 to Lb3 are positioned away from the magnetic tape 41. However, they may be positioned inversely.

Many widely different embodiments of the present invention may be constructed without departing from the spirit and scope of the present invention. It should be understood that the present invention is not limited to the specific embodiments described in this specification, except as defined in the appended claims.

What is claimed is:

1. A tracking control device for magnetic recording/reproducing apparatus arranged in such a manner that a head unit having a plurality of magnetic heads is successively moved in the widthwise direction of a magnetic tape for switching tracking positions so that data recording/reproducing is, by each of said plurality of magnetic heads, performed along a plurality of data tracks formed on said magnetic tape in parallel to a direction in which said magnetic tape moves, said tracking control device comprising:

at least two servo signal reproducing heads provided integrally with said head unit and provided for the purpose of reproducing servo signals for tracking use from a plurality of servo tracks formed in parallel to said data tracks on said magnetic tape; and movement control means for controlling movement of said head unit, including a first band pass filter connected to receive an output from one of said servo signal reproducing heads corresponding to said each of said tracking positions, said band pass filter changing its frequency characteristics for each of said servo tracks to pass components having frequencies which approximate to the frequency of the one of said servo signals among the servo signals, a second band pass filter connected to said receive an output from another servo signal reproducing head adjacent to said one of said servo signal reproducing heads, a first amplitude detector for detecting the amplitude of the output from said first band pass filter, a second amplitude detector for detecting the amplitude of the output from said second band pass filter, a comparator for comparing the output level from said first amplitude detector with the output level from said second amplitude detector, and a servo controller for controlling, at each of said tracking positions, movement of said head unit in said widthwise direction in response to the output from said comparator, wherein a pitch of said servo tracks is an integral multiple of a pitch of said data tracks, the number of said servo tracks is the same or smaller than the number of said tracking positions to be switched and said servo signal reproducing heads are disposed at substantially the same pitch as said pitch of said data tracks in said widthwise direction.

2. A tracking control device according to claim 1 wherein said servo signals are recorded on said servo tracks with different frequencies.

3. A tracking control device according to claim 1, wherein a servo signal recording head for recording servo signals to said servo tracks is provided for said head unit.

4. A tracking control device according to claim 1, wherein n is the number of said tracking positions to be switched, l is the number of said servo tracks and m is the number of said servo signal reproducing heads, and a relationship $n = l \cdot (m-1)$ is held.

5. A tracking control device according to claim 1, wherein said magnetic heads and said servo signal reproducing heads are formed as thin film heads made by a semiconductor process.

6. A tracking control device for magnetic recording/reproducing apparatus arranged in such a manner that a head unit having a plurality of magnetic heads is successively moved in the widthwise direction of a magnetic tape for switching tracking positions so that data recording/reproducing is, by each of said plurality of magnetic heads, performed along a plurality of data tracks formed on said magnetic tape in parallel to a direction in which said magnetic tape moves, said tracking control device comprising:

servo signal reproducing heads provided integrally with said head unit and provided for the purpose of reproducing servo signals for tracking use from a servo track formed in parallel to said data tracks on said magnetic tape; and movement control means for controlling movement of said head unit, including a first amplitude detector for detecting the amplitude of an output from one of said servo signal reproducing heads corresponding to each of said tracking positions, a second amplitude detector for detecting the amplitude of an output from another servo signal reproducing head adjacent to said one of said servo signal reproducing heads, a comparator for comparing the output level from said first amplitude detector with the output level from said second amplitude detector, and a servo controller for controlling, at each of said tracking positions, movement of said head unit in said widthwise direction in response to the output from said comparator, wherein the number of said servo signal reproducing heads is larger than, by one, the number of said tracking positions to be switched and said servo signal reproducing heads are, in said widthwise direction, disposed at substantially the same pitch as a pitch of said data tracks.

7. A tracking control device according to claim 6, wherein a servo signal reproducing head for recording servo signals to said servo tracks is provided for said head unit.

8. A tracking control device according to claim 6, wherein said magnetic heads and said servo signal reproducing heads are formed as thin film heads made by a semiconductor process.

9. A tracking control device for magnetic recording-/reproducing apparatus arranged in such a manner that a head unit having a plurality of magnetic heads is successively moved in the widthwise direction of a magnetic tape for switching tracking positions so that data recording/reproducing is, by each of said plurality of magnetic heads, performed along a plurality of data tracks formed on said magnetic tape in parallel to a direction in which said magnetic tape moves, said tracking control device comprising:

servo signal reproducing heads provided integrally with said head unit and provided for the purpose of reproducing servo signals for tracking use recorded along one end portion of said magnetic tape with respect to said widthwise direction; and movement control means for controlling movement of said head unit, including an amplitude detector for detecting the amplitude of the output from one of said servo signal reproducing heads corresponding to said each of said tracking positions, a reference amplitude voltage generator for generating reference amplitude voltage, a comparator for generating an error signal by comparing the output level from said amplitude detector with the output level from said reference amplitude voltage generator, and a drive means for controlling, at each of said tracking positions, movement of said head unit in said widthwise direction in response to the error signal transmitted from the comparator, wherein the number of said servo signal reproducing heads is the same as the number of said tracking positions to be switched and said servo signal reproducing heads are, in said widthwise direction, disposed at substantially the same pitch as a pitch of said data tracks.

10. A tracking control device according to claim 9, wherein a servo signal recording head for recording servo signals to said servo tracks is provided for said head unit.

11. A tracking control device according to claim 9, wherein said magnetic heads and said servo signal reproducing heads are formed as thin film heads made by a semiconductor process.

12. A tracking control device according to claim 10, wherein said magnetic heads and said servo signal reproducing heads are formed as thin film heads made by a semiconductor process.

13. A tracking control device for a magnetic recording/reproducing apparatus arranged in such a manner that a head unit having a plurality of magnetic heads is successively moved in the widthwise direction of a magnetic tape for switching tracking positions so that data recording/reproducing is, by each of said plurality of magnetic heads, performed along a plurality of data tracks formed on said magnetic tape in parallel to a direction in which said magnetic tape moves, said tracking control device comprising:

a first group of servo-signal reproducing heads provided integrally with said head unit and provided for the purpose of reproducing servo signals for tracking use recorded along one end portion of said magnetic tape with respect to said widthwise direction;

a second group of servo-signal reproducing heads provided integrally with said head unit and provided for the purpose of reproducing servo signals for tracking use recorded along the other end portion of said magnetic tape with respect to said widthwise direction; and movement control means for controlling movement of said head unit, including a first amplitude detector for detecting the amplitude of an output from said servo signal reproducing head of said first group corresponding to said each of said tracking positions, a second amplitude detector for detecting the amplitude of an output from said servo signal reproducing head of said second group corresponding to said each of said tracking positions, a comparator for comparing the output level from said first amplitude detector with the output level from said second amplitude detector, and a drive means for controlling, at each of said tracking positions, movement of said head unit in said widthwise direction in response to the output from said comparator, wherein the number of said servo-signal reproducing heads of said first group and that of said second group are respectively the same as the number of said tracking positions to be switched and said servo-signal reproducing heads of said first group and said second group are, in said widthwise direction, disposed at substantially the same pitch as a pitch of said data tracks respectively.

14. A tracking control device according to claim 13, wherein a servo signal recording head for recording a servo signal to said servo tracks is provided for said head unit.

15. A tracking control device for a magnetic recording/reproducing apparatus having a combination head including magnetic heads the number of which is smaller than the number of data tracks formed on said magnetic tape in parallel to a direction in which a magnetic tape moves and being arranged to perform data recording/reproducing along said data tracks by successively moving said combination head in said widthwise direction for switching tracking positions, said tracking control device comprising:

reflecting type photointerrupters each of which is provided integrally with said combination head so as to confront one of widthwise ends of said magnetic tape at corresponding one of said tracking positions for generating a signal which denotes intensity of light reflected from said magnetic tape;

movement control means for controlling movement of said combination head, including a reference voltage generator for generating reference voltage, a comparator for generating an error signal by comparing the output level from one of said reflecting type photointerrupters with the output level from said reference voltage generator, and a servo controller for controlling, at each of said tracking positions, movement of said combination head unit in said widthwise direction in response to the error signal transmitted from the comparator, wherein the number of said reflecting type photointerrupters is the same as the number of said tracking positions to be switched and said reflecting type photointerrupters are disposed at substantially the same pitch as a pitch of said data tracks in said widthwise direction.

16. A tracking control device according to claim 15, wherein each of said reflecting type photointerrupters comprises a light emitting device and a light receiving device.

17. A tracking control device according to claim 15, wherein said reference signal is transmitted from a reflecting type photointerrupter provided for said combination unit for the purpose of detecting the intensity of light reflected from portions except for said widthwise ends of said magnetic tape.

18. A tracking control device according to claim 15, wherein said magnetic heads are formed as thin film heads made by a semiconductor process.

19. A tracking control device for a magnetic recording/reproducing apparatus having a combination head including magnetic heads the number of which is smaller than the number of data tracks formed on said magnetic tape in parallel to a direction in which a magnetic tape moves and being arranged to perform data recording/reproducing along said data tracks by successively moving said combination head in said widthwise direction for switching tracking positions, said tracking control device comprising:

a first group of reflecting type photointerrupters each of which is provided integrally with said combination head so as to confront one of widthwise ends of said magnetic tape at corresponding one of said tracking positions for generating a signal which denotes intensity of light reflected from said magnetic tape;

a second group of reflecting type photointerrupters each of which is provided integrally with said combination head so as to confront the other of said widthwise ends of said magnetic tape at corresponding one of said tracking positions for generating a signal which denotes intensity of light reflected from said magnetic tape; and movement control means for controlling, at each of said tracking positions, movement of said combination head in said widthwise direction in accordance with the difference between a level of a signal generated by one of said reflecting type photointerrupters of said first group which confronts said one of said widthwise ends and a level of a signal generated by one of said reflecting type photointerrupters of said second group which confronts said other of said widthwise ends, wherein the number of said reflecting type photointerrupters of said first group and that of said second group are respectively the same as the number of said tracking positions to be switched and said reflecting type photointerrupters of said first group and said second group are, in said widthwise direction, disposed at substantially the same pitch as a pitch of said data tracks respectively.

20. A tracking control device according to claim 19, wherein each of said reflecting type photointerrupters comprises a light emitting device and a light receiving device.

* * * * *